US012725832B2

(12) United States Patent
Kong et al.

(10) Patent No.: US 12,725,832 B2
(45) Date of Patent: Sep. 1, 2026

(54) ELECTROLYTES FOR SILICON-CONTAINING ELECTRODES

(71) Applicant: GM GLOBAL TECHNOLOGY OPERATIONS LLC, Detroit, MI (US)

(72) Inventors: Dewen Kong, Shanghai (CN); Haijing Liu, Shanghai (CN); Si Chen, Shanghai (CN); Mengyan Hou, Shanghai (CN); Mark W. Verbrugge, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 703 days.

(21) Appl. No.: 18/127,524

(22) Filed: Mar. 28, 2023

(65) Prior Publication Data

US 2024/0250301 A1 Jul. 25, 2024

(30) Foreign Application Priority Data

Jan. 9, 2023 (CN) ......................... 202310030235.4

(51) Int. Cl.
*H01M 10/0567* (2010.01)
*H01M 4/02* (2006.01)
(Continued)

(52) U.S. Cl.
CPC ....... *H01M 10/0567* (2013.01); *H01M 4/364* (2013.01); *H01M 4/5825* (2013.01);
(Continued)

(58) Field of Classification Search
None
See application file for complete search history.

(56) References Cited

U.S. PATENT DOCUMENTS 8,440,350 B1 5/2013 Verbrugge et al.
8,859,144 B2 10/2014 Xiao
(Continued)

FOREIGN PATENT DOCUMENTS

CN 118352462 A 7/2024
DE 102022118603 A1 8/2023
(Continued)

OTHER PUBLICATIONS

Zhongyi Liu et al.; U.S. Appl. No. 17/473,856, filed Sep. 13, 2021 titled "Methods of Producing Pre-Lithiated Silicon Oxide Electroactive Materials Comprising Silicides and Silicates"; 50 pages.
(Continued)

*Primary Examiner* — Travis M Figg
*Assistant Examiner* — Suhani Jitendra Patel
(74) *Attorney, Agent, or Firm* — Harness, Dickey & Pierce, P.L.C.

(57) ABSTRACT

An electrochemical cell that cycles lithium ions includes a positive electrode that includes a positive electroactive material, a negative electrode that includes a silicon-containing negative electroactive material, a separating layer disposed between the positive electrode and the negative electrode, and an electrolyte that is in contact with at least one of the positive electroactive material, the negative electroactive material, and the separating layer. The electrolyte includes greater than or equal to about 0.1 wt. % to less than or equal to about 10 wt. % of a phosphite-type additive.

18 Claims, 5 Drawing Sheets

(51) Int. Cl.

| | |
|---|---|
| ***H01M 4/36*** | (2006.01) |
| ***H01M 4/58*** | (2010.01) |
| ***H01M 4/583*** | (2010.01) |
| ***H01M 10/0525*** | (2010.01) |
| ***H01M 10/0568*** | (2010.01) |
| ***H01M 10/0569*** | (2010.01) |
| ***H01M 50/46*** | (2021.01) |

(52) U.S. Cl.

CPC ....... *H01M 4/583* (2013.01); *H01M 10/0525* (2013.01); *H01M 10/0568* (2013.01); *H01M 10/0569* (2013.01); *H01M 50/46* (2021.01); *H01M 2004/027* (2013.01); *H01M 2300/0037* (2013.01); *H01M 2300/0051* (2013.01)

(56) References Cited

U.S. PATENT DOCUMENTS

| | | | | |
|---|---|---|---|---|
| 8,999,584 | B2 | 4/2015 | Jiang et al. | |
| 9,005,811 | B2 | 4/2015 | Xiao et al. | |
| 9,093,705 | B2 | 7/2015 | Xiao et al. | |
| 9,142,830 | B2 | 9/2015 | Xiao et al. | |
| 9,302,914 | B2 | 4/2016 | Liu et al. | |
| 9,362,551 | B2 | 6/2016 | Sachdev et al. | |
| 9,379,374 | B2 | 6/2016 | Liu et al. | |
| 9,531,004 | B2 | 12/2016 | Xiao et al. | |
| 9,564,639 | B2 | 2/2017 | Huang | |
| 9,570,752 | B2 | 2/2017 | Huang et al. | |
| 9,577,251 | B2 | 2/2017 | Xiao et al. | |
| 9,780,361 | B2 | 10/2017 | Xiao et al. | |
| 10,062,898 | B2 | 8/2018 | Xiao | |
| 10,141,569 | B2 | 11/2018 | Verbrugge et al. | |
| 10,164,245 | B2 | 12/2018 | Huang | |
| 10,476,074 | B2 | 11/2019 | Xiao et al. | |
| 10,593,988 | B2 | 3/2020 | Xiao et al. | |
| 10,803,687 | B1 | 10/2020 | Khamis et al. | |
| 10,854,882 | B2 | 12/2020 | Halalay et al. | |
| 10,868,307 | B2 | 12/2020 | Huang | |
| 10,892,481 | B2 | 1/2021 | Balogh et al. | |
| 10,950,846 | B2 | 3/2021 | Xiao et al. | |
| 10,985,363 | B2 | 4/2021 | Xiao et al. | |
| 11,011,742 | B2 | 5/2021 | Sachdev et al. | |
| 11,228,037 | B2 | 1/2022 | Huang et al. | |
| 11,316,142 | B2 | 4/2022 | Jiang et al. | |
| 11,342,545 | B2 | 5/2022 | Cain et al. | |
| 11,349,119 | B2 | 5/2022 | Halalay et al. | |
| 11,374,218 | B2 | 6/2022 | Jiang et al. | |
| 11,424,442 | B2 | 8/2022 | Frieberg et al. | |
| 11,476,463 | B2 | 10/2022 | Cain et al. | |
| 11,498,839 | B2 | 11/2022 | Abd Elhamid et al. | |
| 11,527,745 | B2 | 12/2022 | Verbrugge et al. | |
| 11,575,115 | B2 | 2/2023 | Halalay et al. | |
| 2012/0141883 | A1* | 6/2012 | Smart .................. | H01M 6/164<br>429/330 |
| 2016/0248121 | A1* | 8/2016 | Uematsu .............. | H01M 4/505 |
| 2017/0294688 | A1* | 10/2017 | Jang ..................... | H01M 4/366 |
| 2018/0205114 | A1 | 7/2018 | Pauric et al. | |
| 2018/0375156 | A1* | 12/2018 | Zhamu .................... | C07C 21/04 |
| 2019/0198934 | A1 | 6/2019 | Liu et al. | |
| 2020/0176755 | A1 | 6/2020 | Huang et al. | |
| 2020/0227728 | A1 | 7/2020 | Huang et al. | |
| 2020/0350558 | A1 | 11/2020 | Jimenez et al. | |
| 2020/0388825 | A1 | 12/2020 | Verbrugge et al. | |
| 2021/0020899 | A1 | 1/2021 | Halalay et al. | |
| 2021/0066704 | A1 | 3/2021 | Verbrugge et al. | |
| 2021/0135193 | A1 | 5/2021 | Wang et al. | |
| 2021/0135194 | A1 | 5/2021 | Wang et al. | |
| 2021/0151761 | A1 | 5/2021 | Jimenez et al. | |
| 2021/0151764 | A1 | 5/2021 | Ellison et al. | |
| 2021/0151765 | A1 | 5/2021 | Ellison et al. | |
| 2021/0151787 | A1 | 5/2021 | Xiao et al. | |
| 2021/0175491 | A1 | 6/2021 | Frieberg et al. | |
| 2021/0234153 | A1 | 7/2021 | Xiao et al. | |
| 2021/0290564 | A1 | 9/2021 | Shaw | |
| 2021/0296633 | A1 | 9/2021 | Liu et al. | |
| 2021/0351433 | A1* | 11/2021 | Yamaguchi ......... | H01M 4/5825 |
| 2021/0408517 | A1 | 12/2021 | Bobel et al. | |
| 2022/0045326 | A1 | 2/2022 | Cain et al. | |
| 2022/0069280 | A1 | 3/2022 | Xiao et al. | |
| 2022/0102704 | A1 | 3/2022 | Verbrugge et al. | |
| 2022/0102712 | A1 | 3/2022 | Huang et al. | |
| 2022/0102725 | A1 | 3/2022 | Xiao et al. | |
| 2022/0123279 | A1 | 4/2022 | Mao et al. | |
| 2022/0140324 | A1 | 5/2022 | Ellison et al. | |
| 2022/0238911 | A1 | 7/2022 | Yang et al. | |
| 2022/0302435 | A1 | 9/2022 | Huang et al. | |
| 2022/0302459 | A1 | 9/2022 | Yang et al. | |
| 2022/0320489 | A1 | 10/2022 | Frieberg et al. | |
| 2022/0320493 | A1 | 10/2022 | Frieberg et al. | |
| 2022/0384776 | A1 | 12/2022 | Cain et al. | |
| 2023/0006201 | A1 | 1/2023 | Wang et al. | |
| 2023/0019313 | A1 | 1/2023 | Mao et al. | |
| 2023/0077943 | A1 | 3/2023 | Liu et al. | |
| 2023/0101215 | A1 | 3/2023 | Yu et al. | |
| 2023/0102190 | A1 | 3/2023 | Xiao et al. | |
| 2023/0231110 | A1 | 7/2023 | Hou et al. | |
| 2023/0246161 | A1 | 8/2023 | Su et al. | |
| 2023/0246242 | A1 | 8/2023 | Hou et al. | |
| 2023/0299359 | A1 | 9/2023 | Halalay et al. | |
| 2023/0387398 | A1 | 11/2023 | Ellison et al. | |
| 2024/0030405 | A1 | 1/2024 | Wang et al. | |

FOREIGN PATENT DOCUMENTS

| | | | |
|---|---|---|---|
| DE | 102023105218 | A1 | 7/2024 |
| WO | WO-2018068547 | A1 | 4/2018 |

OTHER PUBLICATIONS

Paul Taichiang Yu et al.; U.S. Appl. No. 17/486,378, filed Sep. 27, 2021 titled "Solid-State Synthesis for the Fabrication of a Layered Anode Material"; 46 pages.

Xingcheng Xiao et al.; U.S. Appl. No. 17/489,260, filed Sep. 29, 2021 titled "Negative Electroactive Materials and Methods of Forming the Same"; 55 pages.

Ion C. Halalay et al.; U.S. Appl. No. 17/695,304, filed Mar. 15, 2022 titled "Electrolyte Composition for Lithium-Ion Cells With Silicon Electrodes"; 35 pages.

Nicole Ellison et al.; U.S. Appl. No. 17/824,601, filed May 25, 2022 titled "Carbon Additives for Silicon-Containing Electrodes"; 42 pages.

Meixian Wang et al.; U.S. Appl. No. 17/869,389, filed Jul. 20, 2022 titled "Composite Electrodes"; 58 pages.

Qili Su et al.; U.S. Appl. No. 17/882,246, filed Aug. 5, 2022 titled "Pre-Lithiation, Precursor Electrodes and Methods of Making and Using the Same"; 65 pages.

Mengyan Hou et al.; U.S. Appl. No. 17/882,876, filed Aug. 8, 2022 titled "Carbon-Coated Lithiated Silicon-Based Electroactive Materials and Methods of Making the Same"; 45 pages.

Mengyan Hou et al.; U.S. Appl. No. 17/884,234, filed Aug. 9, 2022 titled "Electroactive Materials for High-Performance Batteries"; 45 pages.

Eshetu, Gebrekidan Gebresilassie et al.; Production of high-energy Li-ion batteries comprising silicon-containing anodes and insertion-type cathodes. Nature Communications, 2021, vol. 12, Article No. 5459. DOI: 10.1038/s41467-021-25334-8.

Kim, Jongjung et al.; Communication-A Phosphorus Pentafluoride Scavenger to Suppress Solid Electrolyte Interphase Damage at Moderately Elevated Temperature. Journal of the Electrochemical Society, 2017, vol. 164, A3699. DOI: 10.1149/2.0691714jes.

First Office Action for German Patent Application No. 10 2023 105 218.7 issued on Oct. 6, 2023, with correspondence from Manitz Finsterwald Patent- und Rechtsanwaltspartnerschaft mbB summarizing Office Action; 8 pages.

* cited by examiner

ELECTROLYTES FOR SILICON-CONTAINING ELECTRODES

CROSS-REFERENCE TO RELATED APPLICATIONS

This application claims the benefit and priority of Chinese Application No. 202310030235.4, filed Jan. 9, 2023. The entire disclosure of the above application is incorporated herein by reference.

INTRODUCTION

This section provides background information related to the present disclosure which is not necessarily prior art.

Advanced energy storage devices and systems are in demand to satisfy energy and/or power requirements for a variety of products, including automotive products such as start-stop systems (e.g., 12 V start-stop systems), battery-assisted systems, hybrid electric vehicles ("HEVs"), and electric vehicles ("EVs"). Typical lithium-ion batteries include at least two electrodes and an electrolyte and/or separator. One of the two electrodes may serve as a positive electrode or cathode and the other electrode may serve as a negative electrode or anode. A separator filled with a liquid or solid electrolyte may be disposed between the negative and positive electrodes. The electrolyte is suitable for conducting lithium ions between the electrodes and, like the two electrodes, may be in solid and/or liquid form and/or a hybrid thereof. In instances of solid-state batteries, which include solid-state electrodes and a solid-state electrolyte (or solid-state separator), the solid-state electrolyte (or solid-state separator) may physically separate the electrodes so that a distinct separator is not required.

Many different materials may be used to create components for a lithium-ion battery. The negative electrode typically includes a lithium insertion material or an alloy host material. For example, typical electroactive materials for forming an anode include graphite and/or other forms of carbon, silicon and/or silicon oxide and/or other forms of silicon, and/or tin and/or tin alloys. Certain anode materials have particular advantages. While graphite having a theoretical specific capacity of 372 $mAh \cdot g^{-1}$ is most widely used in lithium-ion batteries, anode materials with high specific capacity, for example high specific capacities ranging about 900 $mAh \cdot g^{-1}$ to about 4,200 $mAh \cdot g^{-1}$, are of growing interest. For example, silicon has the highest known theoretical capacity for lithium (e.g., about 4,200 $mAh \cdot g^{-1}$), making it an appealing material for rechargeable lithium-ion batteries. Such materials, however, are often susceptible to huge volume expansion during lithiation and delithiation, which can lead to particle pulverization, loss of electrical contact, and unstable solid-electrolyte interface (SEI) formation, causing electrode collapse and capacity fading. Accordingly, it would be desirable to develop improved materials, and methods of making and using the same, that can address these challenges.

SUMMARY

This section provides a general summary of the disclosure, and is not a comprehensive disclosure of its full scope or all of its features.

The present disclosure relates to electrolytes, to electrolytes for silicon-containing electrodes, to electrochemical cells including the same, and to methods of making and using the same.

In various aspects, the present disclosure provides an electrode for an electrochemical cell that cycles lithium ions. The electrode may include a silicon-containing electroactive material and an electrolyte that includes greater than or equal to about 0.1 wt. % to less than or equal to about 10 wt. % of a phosphite-type additive.

In one aspect, the phosphite-type additive may be represented by:

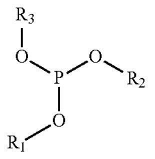

where $R_1$, $R_2$, and $R_3$ are independently selected from trimethylsilyl, linear or branched alkyl ($C_nH_{2n+1}$, where $1 \leq n \leq 20$), linear or branched alkene ($C_nH_{2n}$, where $1 \leq n \leq 20$), linear or branched $C_nM_{2n+1}$ (where $1 \leq n \leq 20$ and M is selected from the group consisting of: fluorine (F), chlorine (Cl), bromine (Br), iodine (I), astatine (At), and combinations thereof), linear or branched $C_nM_{2n}$ (where $1 \leq n \leq 20$ and M is selected from the group consisting of: fluorine (F), chlorine (Cl), bromine (Br), iodine (I), astatine (At), and combinations thereof), phenyl group, mono-substituted phenyl group where the substituted group is a linear or branched alkyl ($C_nH_{2n+1}$, where $1 \leq n \leq 20$), di-substituted phenyl group where the substituted groups comprise a linear or branched alkyl ($C_nH_{2n+1}$, where $1 \leq n \leq 20$), tri-substituted phenyl group where the substituted groups comprise a linear or branched alkyl ($C_nH_{2n+1}$, where $1 \leq n \leq 20$), nitrogen, cyanogen, fluorine (F), chlorine (Cl), bromine (Br), iodine (I), and astatine (At).

In one aspect, $R_1$ is trimethylsilyl.

In one aspect, the phosphite-type additive may be represented by:

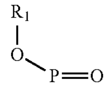

where $R_1$ is selected from trimethylsilyl, linear or branched alkyl ($C_nH_{2n+1}$, where $1 \leq n \leq 20$), linear or branched alkene ($C_nH_{2n}$, where $1 \leq n \leq 20$), linear or branched $C_nM_{2n+1}$ (where $1 \leq n \leq 20$ and M is selected from the group consisting of: fluorine (F), chlorine (Cl), bromine (Br), iodine (I), astatine (At), and combinations thereof), linear or branched $C_nM_{2n}$ (where $1 \leq n \leq 20$ and M is selected from the group consisting of: fluorine (F), chlorine (Cl), bromine (Br), iodine (I), astatine (At), and combinations thereof), phenyl group, mono-substituted phenyl group where the substituted group is a linear or branched alkyl ($C_nH_{2n+1}$, where $1 \leq n \leq 20$), di-substituted phenyl group where the substituted groups comprise a linear or branched alkyl ($C_nH_{2n+1}$, where $1 \leq n \leq 20$), tri-substituted phenyl group where the substituted groups comprise a linear or branched alkyl ($C_nH_{2n+1}$, where $1 \leq n \leq 20$), nitrogen, cyanogen, fluorine (F), chlorine (Cl), bromine (Br), iodine (I), and astatine (At).

In one aspect, the phosphite-type additive may be selected from the group consisting of: tris(trimethylsilyl)phosphite (TMSPI), dimethyl trimethylsilyl phosphite, tris(2,2,2 trifluoroethyl) phosphite, and combinations thereof.

In one aspect, the electrolyte may further include a lithium salt and a solvent. The lithium salt may be selected from the group consisting of: lithium hexafluorophosphate ($LiPF_6$), lithium perchlorate ($LiClO_4$), lithium tetrachloroaluminate ($LiAlCl_4$), lithium iodide (LiI), lithium bromide (LiBr), lithium thiocyanate (LiSCN), lithium tetrafluoroborate ($LiBF_4$), lithium tetraphenylborate ($LiB(C_6H_5)_4$), lithium bis(oxalato)borate ($LiB(C_2O_4)_2$) (LiBOB), lithium difluorooxalatoborate ($LiBF_2(C_2O_4)$), lithium hexafluoroarsenate ($LiAsF_6$), lithium trifluoromethanesulfonate ($LiCF_3SO_3$), lithium bis(trifluoromethane)sulfonylimide ($LiN(CF_3SO_2)_2$), lithium bis(fluorosulfonyl)imide ($LiN(FSO_2)_2$) (LiSFI), lithium bis(trifluoromethanesulfonyl)imide (LiTFSI), lithium difluoro(oxalato)borate (LiDFOB), and combinations thereof. The solvent may be selected from the group consisting of: ethylene carbonate (EC), propylene carbonate (PC), butylene carbonate (BC), fluoroethylene carbonate (FEC), vinylene carbonate (VC), dimethyl carbonate (DMC), diethyl carbonate (DEC), ethylmethylcarbonate (EMC), methyl formate, methyl acetate, methyl propionate, γ-butyrolactone, γ-valerolactone, 1,2-dimethoxyethane, 1-2-diethoxyethane, ethoxymethoxyethane, tetrahydrofuran, 2-methyltetrahydrofuran, 1,3-dioxolane, sulfolane, and combinations thereof.

In one aspect, the solvent may include a first solvent and a second solvent in a mass ratio greater than or equal to about 1:9 to less than or equal to about 5:5.

In one aspect, the first solvent may include ethylene carbonate (EC) and the second solvent may include dimethyl carbonate (DMC).

In one aspect, the electrolyte may further include greater than or equal to about 0.5 wt. % to less than or equal to about 10 wt. % of a secondary additive. The secondary additive may be selected from the group consisting of: fluoroethylene carbonate (FEC), vinylene carbonate (VC), 1,3,2-dioxathiolane 2,2-dioxide (DTD), 1,3-propone sulfone (PS), lithium bis(oxalato)borate ($LiB(C_2O_4)_2$) (LiBOB), lithium bis(fluorosulfonyl)imide ($LiN(FSO_2)_2$) (LiSFI), lithium bis(trifluoromethanesulfonyl)imide (LiTFSI) and combinations thereof.

In one aspect, the electrolyte may include a first secondary additive and a second secondary additive. The first secondary additive may include fluoroethylene carbonate (FEC), and the second secondary additive may include vinylene carbonate (VC).

In one aspect, the silicon-containing electroactive material may include $Li_ySiO_x$, where $0<y<1$ and $0<x<2$.

In one aspect, the electrode may further include a carbonaceous electroactive material.

In various aspects, the present disclosure provides an electrochemical cell that cycles lithium ions. The electrochemical cell may include a positive electrode that includes a positive electroactive material, a negative electrode that includes a silicon-containing negative electroactive material, a separating layer that may be disposed between the positive electrode and the negative electrode, and an electrolyte that may be in contact with at least one of the positive electroactive material, the negative electroactive material, and the separating layer. The electrolyte may include greater than or equal to about 0.1 wt. % to less than or equal to about 10 wt. % of a phosphite-type additive.

In one aspect, the phosphite-type additive may be represented by:

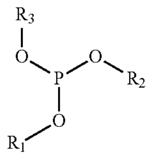

where $R_1$, $R_2$, and $R_3$ are independently selected from trimethylsilyl, linear or branched alkyl ($C_nH_{2n+1}$, where $1 \le n \le 20$), linear or branched alkene ($C_nH_{2n}$, where $1 \le n \le 20$), linear or branched $C_nM_{2n+1}$ (where $1 \le n \le 20$ and M is selected from the group consisting of: fluorine (F), chlorine (Cl), bromine (Br), iodine (I), astatine (At), and combinations thereof), linear or branched $C_nM_{2n}$ (where $1 \le n \le 20$ and M is selected from the group consisting of: fluorine (F), chlorine (Cl), bromine (Br), iodine (I), astatine (At), and combinations thereof), phenyl group, mono-substituted phenyl group where the substituted group is a linear or branched alkyl ($C_nH_{2n+1}$, where $1 \le n \le 20$), di-substituted phenyl group where the substituted groups comprise a linear or branched alkyl ($C_nH_{2n+1}$, where $1 \le n \le 20$), tri-substituted phenyl group where the substituted groups comprise a linear or branched alkyl ($C_nH_{2n+1}$, where $1 \le n \le 20$), nitrogen, cyanogen, fluorine (F), chlorine (Cl), bromine (Br), iodine (I), and astatine (At).

In one aspect, the phosphite-type additive may be represented by:

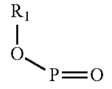

where $R_1$ is selected from trimethylsilyl, linear or branched alkyl ($C_nH_{2n+1}$, where $1 \le n \le 20$), linear or branched alkene ($C_nH_{2n}$, where $1 \le n \le 20$), linear or branched $C_nM_{2n+1}$ (where $1 \le n \le 20$ and M is selected from the group consisting of: fluorine (F), chlorine (Cl), bromine (Br), iodine (I), astatine (At), and combinations thereof), linear or branched $C_nM_{2n}$ (where $1 \le n \le 20$ and M is selected from the group consisting of: fluorine (F), chlorine (Cl), bromine (Br), iodine (I), astatine (At), and combinations thereof), phenyl group, mono-substituted phenyl group where the substituted group is a linear or branched alkyl ($C_nH_{2n+1}$, where $1 \le n \le 20$), di-substituted phenyl group where the substituted groups comprise a linear or branched alkyl ($C_nH_{2n+1}$, where $1 \le n \le 20$), tri-substituted phenyl group where the substituted groups comprise a linear or branched alkyl ($C_nH_{2n+1}$, where $1 \le n \le 20$), nitrogen, cyanogen, fluorine (F), chlorine (Cl), bromine (Br), iodine (I), and astatine (At).

In one aspect, the electrolyte may further include a lithium salt and a solvent. The lithium salt may be selected from the group consisting of: lithium hexafluorophosphate ($LiPF_6$), lithium perchlorate ($LiClO_4$), lithium tetrachloroaluminate ($LiAlCl_4$), lithium iodide (LiI), lithium bromide (LiBr), lithium thiocyanate (LiSCN), lithium tetrafluoroborate ($LiBF_4$), lithium tetraphenylborate ($LiB(C_6H_5)_4$), lithium bis(oxalato)borate ($LiB(C_2O_4)_2$) (LiBOB), lithium difluorooxalatoborate ($LiBF_2(C_2O_4)$), lithium hexafluoroarsenate ($LiAsF_6$), lithium trifluoromethanesulfonate ($LiCF_3SO_3$), lithium bis(trifluoromethane)sulfonylimide ($LiN(CF_3SO_2)_2$), lithium bis(fluorosulfonyl)imide (LiN $(FSO_2)_2$) (LiSFI), lithium bis(trifluoromethanesulfonyl)imide (LiTFSI), lithium difluoro(oxalato)borate (LiDFOB), and combinations thereof. The solvent may be selected from the group consisting of: ethylene carbonate (EC), propylene carbonate (PC), butylene carbonate (BC), fluoroethylene carbonate (FEC), vinylene carbonate (VC), dimethyl carbonate (DMC), diethyl carbonate (DEC), ethylmethylcarbonate (EMC), methyl formate, methyl acetate, methyl propionate, γ-butyrolactone, γ-valerolactone, 1,2-dimethoxyethane, 1-2-diethoxyethane, ethoxymethoxyethane, tetrahydrofuran, 2-methyltetrahydrofuran, 1,3-dioxolane, sulfolane, and combinations thereof.

In one aspect, the electrolyte may further include greater than or equal to about 0.5 wt. % to less than or equal to about 10 wt. % of a secondary additive. The secondary additive may be selected from the group consisting of: fluoroethylene carbonate (FEC), vinylene carbonate (VC), 1,3,2-dioxathiolane 2,2-dioxide (DTD), 1,3-propone sulfone (PS), lithium bis(oxalato)borate ($LiB(C_2O_4)_2$) (LiBOB), lithium bis(fluorosulfonyl)imide ($LiN(FSO_2)_2$) (LiSFI), lithium bis(trifluoromethanesulfonyl)imide (LiTFSI), and combinations thereof.

In one aspect, the silicon-containing electroactive material may include $Li_ySiO_x$, where $0<y<1$ and $0<x<2$.

In various aspects, the present disclosure provides an electrochemical cell that cycles lithium ions. The electrochemical cell may include a positive electrode that includes a positive electroactive material, a negative electrode that includes a negative electroactive material, a separating layer that may be disposed between the positive electrode and the negative electrode, and an electrolyte in contact with at least one of the positive electroactive material, the negative electroactive material, and the separating layer. The negative electroactive material may include $Li_ySiO_x$ (where $0<y<1$ and $0<x<2$) and a carbonaceous electroactive material. The electrolyte may include greater than or equal to about 0.1 wt. % to less than or equal to about 10 wt. % of a phosphite-type additive.

In one aspect, the phosphite-type additive may be represented by:

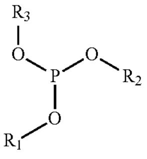
or
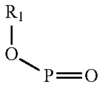

where $R_1$, $R_2$, and $R_3$ are independently selected from trimethylsilyl, linear or branched alkyl ($C_nH_{2n+1}$, where $1 \le n \le 20$), linear or branched alkene ($C_nH_{2n}$, where $1 \le n \le 20$), linear or branched $C_nM_{2n+1}$ (where $1 \le n \le 20$ and M is selected from the group consisting of: fluorine (F), chlorine (Cl), bromine (Br), iodine (I), astatine (At), and combinations thereof), linear or branched $C_nM_{2n}$ (where $1 \le n \le 20$ and M is selected from the group consisting of: fluorine (F), chlorine (Cl), bromine (Br), iodine (I), astatine (At), and combinations thereof), phenyl group, mono-substituted phenyl group where the substituted group is a linear or branched alkyl ($C_nH_{2n+1}$, where $1 \le n \le 20$), di-substituted phenyl group where the substituted groups comprise a linear or branched alkyl ($C_nH_{2n+1}$, where $1 \le n \le 20$), tri-substituted phenyl group where the substituted groups comprise a linear or branched alkyl ($C_nH_{2n+1}$, where $1 \le n \le 20$), nitrogen, cyanogen, fluorine (F), chlorine (Cl), bromine (Br), iodine (I), and astatine (At).

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
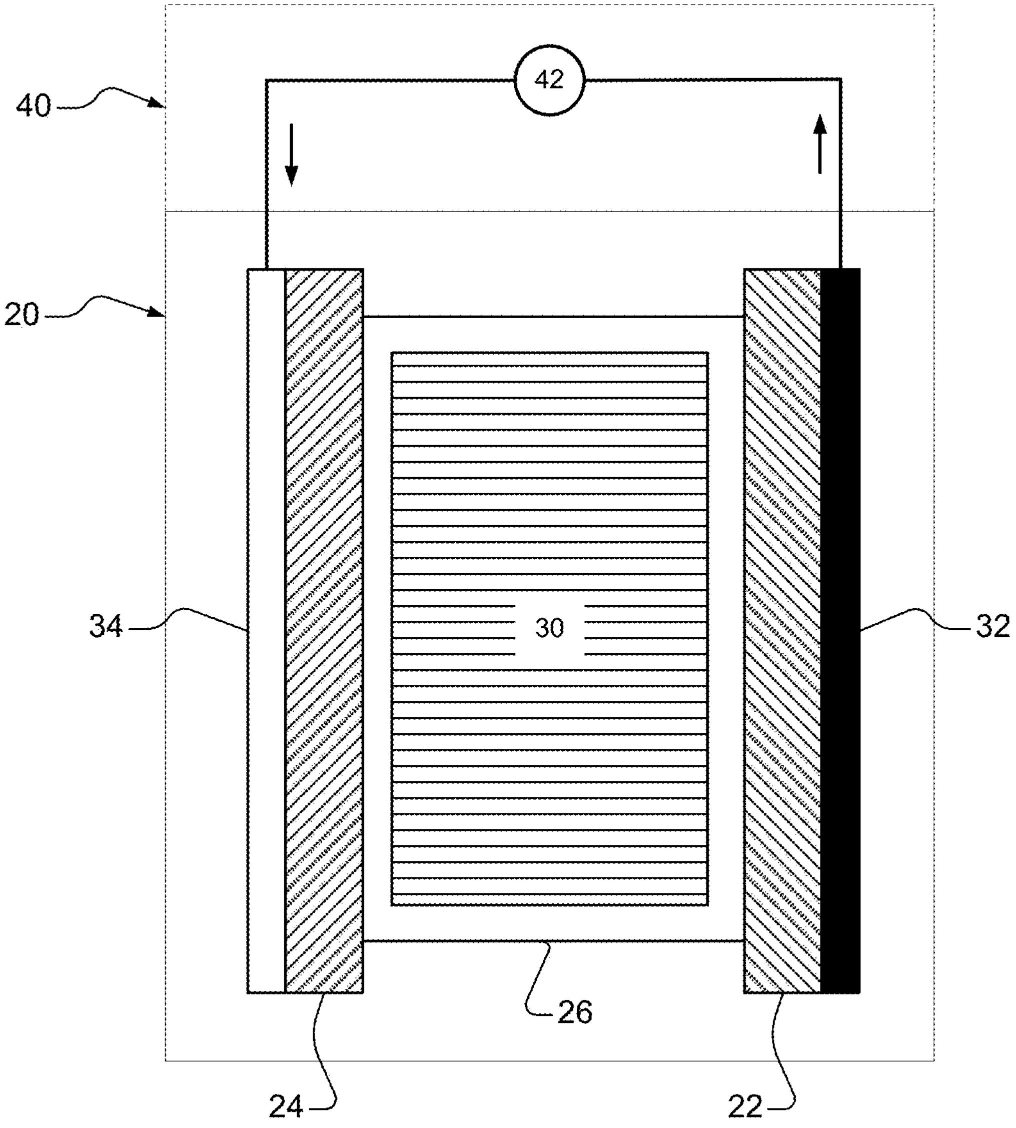
FIG. 1 is an illustration of an example electrochemical cell including an electrolyte in accordance with various aspects of the present disclosure.

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected, or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer, or section. Terms such as "first," "second," and other numerical terms when used herein do not imply a sequence or order unless clearly indicated by the context. Thus, a first step, element, component, region, layer, or section discussed below could be termed a second step, element, component, region, layer, or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates both exactly or precisely the stated numerical value, and also, that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

The present technology relates to electrolytes for use in electrochemical cells, and more particularly to electrolytes for use in electrochemical cells including silicon-containing electrodes, and also to methods of forming and using the same. Such cells can be used in vehicle or automotive transportation applications (e.g., motorcycles, boats, tractors, buses, motorcycles, mobile homes, campers, and tanks). However, the present technology may also be employed in a wide variety of other industries and applications, including aerospace components, consumer goods, devices, buildings (e.g., houses, offices, sheds, and warehouses), office equipment and furniture, and industrial equipment machinery, agricultural or farm equipment, or heavy machinery, by way of non-limiting example. Further, although the illustrated examples detail below include a single positive electrode cathode and a single anode, the skilled artisan will recognize that the present teachings also extend to various other configurations, including those having one or more cathodes and one or more anodes, as well as various current collectors with electroactive layers disposed on or adjacent to one or more surfaces thereof.

An exemplary and schematic illustration of an electrochemical cell (also referred to as a battery) 20 is shown in FIG. 1. The battery 20 includes a negative electrode 22 (e.g., anode), a positive electrode 24 (e.g., cathode), and a separator 26 disposed between the two electrodes 22, 24. The separator 26 provides electrical separation—prevents physical contact—between the electrodes 22, 24. The separator 26 also provides a minimal resistance path for internal passage of lithium ions, and in certain instances, related anions, during cycling of the lithium ions. The separator 26, like the negative electrode 22 and/or the positive electrode 24, may be in a solid and/or a liquid form and/or a hybrid thereof. For example, in certain variations, the separator 26 may include an electrolyte 30 that may also be present in the negative electrode 22 and/or the positive electrode 24. In certain variations, the separator 26 may be formed by a solid-state by a solid-state electrolyte or a semi-solid-state electrolyte (e.g., gel electrolyte). For example, the separator 26 may include a plurality of solid-state electrolyte particles. The negative electrode 22 and/or the positive electrode 24 may additionally or alternatively include a solid-state electrolyte particles. The solid-state electrolyte particles as included in, or defining, the separator 26 may be the same as or different from the solid-state electrolyte particles included in the positive electrode 24 and/or the negative electrode 22.

A first current collector 32 (e.g., a negative current collector) may be positioned at or near the negative electrode (which can also be referred to as a negative electroactive material layer) 22. The first current collector 32 together with the negative electrode 22 may be referred to as a negative electrode assembly. Although not illustrated, the skilled artisan will appreciate that, in certain variations, negative electroactive material layers 22 may be disposed on one or more parallel sides of the first current collector 32. Similarly, the skilled artisan will appreciate that, in other variations, a negative electroactive material layer 22 may be disposed on a first side of the first current collector 32, and a positive electroactive material layer 24 may be disposed on a second side of the first current collector 32. In each instance, the first current collector 32 may be a metal foil, metal grid or screen, or expanded metal comprising copper or any other appropriate electrically conductive material known to those of skill in the art.

A second current collector 34 (e.g., a positive current collector) may be positioned at or near the positive electrode (which can also be referred to as a positive electroactive material layer) 24. The second current collector 34 together with the positive electrode 24 may be referred to as a positive electrode assembly. Although not illustrated, the skilled artisan will appreciate that, in certain variations, positive electroactive material layer 24 may be disposed on one or more parallel sides of the second current collector 34. Similarly, the skilled artisan will appreciate that, in other variations, a positive electroactive material layer 24 may be disposed on a first side of the second current collector 34, and a negative electroactive material layer 22 may be disposed on a second side of the second current collector 34. In each instance, the second electrode current collector 34 may be a metal foil, metal grid or screen, or expanded metal comprising aluminum or any other appropriate electrically conductive material known to those of skill in the art.

The first current collector 32 and the second current collector 34 may respectively collect and move free electrons to and from an external circuit 40. For example, an interruptible external circuit 40 and a load device 42 may connect the negative electrode 22 (through the first current collector 32) and the positive electrode 24 (through the second current collector 34). The battery 20 can generate an electric current during discharge by way of reversible electrochemical reactions that occur when the external circuit 40 is closed (to connect the negative electrode 22 and the positive electrode 24) and the negative electrode 22 has a lower potential than the positive electrode. The chemical potential difference between the positive electrode 24 and the negative electrode 22 drives electrons produced by a reaction, for example, the oxidation of intercalated lithium, at the negative electrode 22 through the external circuit 40 toward the positive electrode 24. Lithium ions that are also produced at the negative electrode 22 are concurrently transferred through the electrolyte 30 contained in the separator 26 toward the positive electrode 24. The electrons flow through the external circuit 40 and the lithium ions migrate across the separator 26 containing the electrolyte 30 to form intercalated lithium at the positive electrode 24. As noted above, the electrolyte 30 is typically also present in the negative electrode 22 and positive electrode 24. The electric current passing through the external circuit 40 can be harnessed and directed through the load device 42 until the lithium in the negative electrode 22 is depleted and the capacity of the battery 20 is diminished.

The battery 20 can be charged or re-energized at any time by connecting an external power source to the lithium-ion battery 20 to reverse the electrochemical reactions that occur during battery discharge. Connecting an external electrical energy source to the battery 20 promotes a reaction, for example, non-spontaneous oxidation of intercalated lithium, at the positive electrode 24 so that electrons and lithium ions are produced. The lithium ions flow back toward the negative electrode 22 through the electrolyte 30 across the separator 26 to replenish the negative electrode 22 with lithium (e.g., intercalated lithium) for use during the next battery discharge event. As such, a complete discharging event followed by a complete charging event is considered to be a cycle, where lithium ions are cycled between the positive electrode 24 and the negative electrode 22. The external power source that may be used to charge the battery 20 may vary depending on the size, construction, and particular end-use of the battery 20. Some notable and exemplary external power sources include, but are not limited to, an AC-DC converter connected to an AC electrical power grid though a wall outlet and a motor vehicle alternator.

In many lithium-ion battery configurations, each of the first current collector 32, negative electrode 22, separator 26, positive electrode 24, and second current collector 34 are prepared as relatively thin layers (for example, from several microns to a fraction of a millimeter or less in thickness) and assembled in layers connected in electrical parallel arrangement to provide a suitable electrical energy and power package. In various aspects, the battery 20 may also include a variety of other components that, while not depicted here, are nonetheless known to those of skill in the art. For instance, the battery 20 may include a casing, gaskets, terminal caps, tabs, battery terminals, and any other conventional components or materials that may be situated within the battery 20, including between or around the negative electrode 22, the positive electrode 24, and/or the separator 26. The battery 20 shown in FIG. 1 includes a liquid electrolyte 30 and shows representative concepts of battery operation.

The size and shape of the battery 20 may vary depending on the particular application for which it is designed. Battery-powered vehicles and hand-held consumer electronic devices, for example, are two examples where the battery 20 would most likely be designed to different size, capacity, and power-output specifications. The battery 20 may also be connected in series or parallel with other similar lithium-ion cells or batteries to produce a greater voltage output, energy, and power if it is required by the load device 42. Accordingly, the battery 20 can generate electric current to a load device 42 that is part of the external circuit 40. The load device 42 may be powered by the electric current passing through the external circuit 40 when the battery 20 is discharging. While the electrical load device 42 may be any number of known electrically-powered devices, a few specific examples include an electric motor for an electrified vehicle, a laptop computer, a tablet computer, a cellular phone, and cordless power tools or appliances. The load device 42 may also be an electricity-generating apparatus that charges the battery 20 for the purpose of storing electrical energy.

With renewed reference to FIG. 1, the positive electrode 24, the negative electrode 22, and the separator 26 may each include an electrolyte solution or system 30 inside their pores, capable of conducting lithium ions between the negative electrode 22 and the positive electrode 24. Any appropriate electrolyte 30, whether in solid, liquid, or gel form, capable of conducting lithium ions between the negative electrode 22 and the positive electrode 24, may be used in the lithium-ion battery 20. In each variation, the electrolyte 30 includes an electrolyte additive. For example, the electrolyte 30 may include greater than or equal to about 0.1 weight percent (wt. %) to less than or equal to about 10 wt. %, optionally greater than or equal to about 0.1 weight percent (wt. %) to less than or equal to about 5 wt. %, optionally greater than or equal to about 0.3 wt. % to less than or equal to about 3 wt. %, optionally greater than or equal to about 0.5 wt. % to less than or equal to about 2 wt. %, and in certain aspects, optionally about 1 wt. %, of the electrolyte additive.

The electrolyte additive includes a phosphite-type additive. In certain variations, the phosphite-type additive may be represented by:

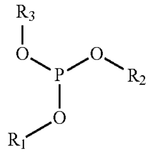

where $R_1$, $R_2$, and $R_3$ are independently selected from trimethylsilyl, linear or branched alkyl ($C_nH_{2n+1}$, where 1≤n≤20), linear or branched alkene ($C_nH_{2n}$, where 1≤n≤20), linear or branched $C_nM_{2n+1}$ (where 1≤n≤20 and M is selected from the group consisting of: fluorine (F), chlorine (Cl), bromine (Br), iodine (I), astatine (At), and combinations thereof), linear or branched $C_nM_{2n}$ (where 1≤n≤20 and M is selected from the group consisting of: fluorine (F), chlorine (Cl), bromine (Br), iodine (I), astatine (At), and combinations thereof), phenyl group, mono-substituted phenyl group where the substituted group is a linear or branched alkyl ($C_nH_{2n+1}$, where 1≤n≤20), di-substituted phenyl group where the substituted groups include a linear or branched alkyl ($C_nH_{2n+1}$, where 1≤n≤20), tri-substituted phenyl group where the substituted groups include a linear or branched alkyl ($C_nH_{2n+1}$, where 1≤n≤20), nitrogen, cyanogen, fluorine (F), chlorine (Cl), bromine (Br), iodine (I), and/or astatine (At). For example, in certain variations, the phosphite-type additive may include at least one trimethylsilyl group and may be represented by:

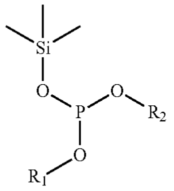

where $R_1$ and $R_2$ are independently selected from trimethylsilyl, linear or branched alkyl ($C_nH_{2n+1}$, where 1≤n≤20), linear or branched alkene ($C_nH_{2n}$, where 1≤n≤20), linear or branched $C_nM_{2n+1}$ (where 1≤n≤20 and M is selected from the group consisting of: fluorine (F), chlorine (Cl), bromine (Br), iodine (I), astatine (At), and combinations thereof), linear or branched $C_nM_{2n}$ (where 1≤n≤20 and M is selected from the group consisting of: fluorine (F), chlorine (Cl), bromine (Br), iodine (I), astatine (At), and combinations thereof), phenyl group, mono-substituted phenyl group where the substituted group is a linear or branched alkyl ($C_nH_{2n+1}$, where 1≤n≤20), di-substituted phenyl group where the substituted groups include a linear or branched alkyl ($C_nH_{2n+1}$, where 1≤n≤20), tri-substituted phenyl group where the substituted groups include a linear or branched alkyl ($C_nH_{2n+1}$, where 1≤n≤20), nitrogen, cyanogen, fluorine (F), chlorine (Cl), bromine (Br), iodine (I), and/or astatine (At). Further still, in certain variations, the phosphite-type additive may include tris(trimethylsilyl)phosphite (TMSPI), dimethyl trimethylsilyl phosphite, tris(2,2,2 trifluoroethyl) phosphite, and combinations thereof.

In other variations, the phosphite-type additive may be a substituted phosphite molecule represented by:

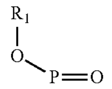

where $R_1$ is trimethylsilyl, linear or branched alkyl ($C_nH_{2n+1}$, where 1≤n≤20), linear or branched alkene ($C_nH_{2n}$, where 1≤n≤20), linear or branched $C_nM_{2n+1}$ (where 1≤n≤20 and M is selected from the group consisting of: fluorine (F), chlorine (Cl), bromine (Br), iodine (I), astatine (At), and combinations thereof), linear or branched $C_nM_{2n}$ (where 1≤n≤20 and M is selected from the group consisting of: fluorine (F), chlorine (Cl), bromine (Br), iodine (I), astatine (At), and combinations thereof), phenyl group, mono-substituted phenyl group where the substituted group is a linear or branched alkyl ($C_nH_{2n+1}$, where 1≤n≤20), di-substituted phenyl group where the substituted groups include a linear or branched alkyl ($C_nH_{2n+1}$, where 1≤n≤20), tri-substituted phenyl group where the substituted groups include a linear or branched alkyl ($C_nH_{2n+1}$, where 1≤n≤20), nitrogen, cyanogen, fluorine (F), chlorine (Cl), bromine (Br), iodine (I), and/or astatine (At).

In each variations, the phosphite-type additive may help to form a stable solid electrolyte interphase (SEI) on one or more surfaces of the negative electrode 22, and more specifically, on a surface of the negative electrode 22 that faces the separator 26. For example, the phosphite additive may decompose during the formation cycle to generate a P—O—Si species containing solid electrolyte interphase film on one or more surfaces of the negative electrode 22. The phosphite-derived solid electrolyte interphase film may help to stabilize the interfacial stability and effectively mitigate the electrolyte degradation to increase the cell cyclability. Further, as detailed below, the phosphite-type additive may also help to improve the columbic efficiency of the cell, for example by reducing cell swelling.

In certain variations, the phosphite-type additive may be a first electrolyte additive and the electrolyte 30 may include a second electrolyte additive. For example, the electrolyte may include greater than or equal to about 0.1 wt. % to less than or equal to about 5 wt. %, optionally greater than or equal to about 0.3 wt. % to less than or equal to about 3 wt. %, optionally greater than or equal to about 0.5 wt. % to less than or equal to about 2 wt. %, and in certain aspects, optionally about 1 wt. %, of the first electrolyte additive (i.e., the phosphite-type additive), and greater than or equal to about 0.1 wt. % to less than or equal to about 10 wt. %, optionally greater than or equal to about 0.5 wt. % to less than or equal to about 10 wt. %, optionally greater than or equal to about 0.5 wt. % to less than or equal to about 5 wt. %, and in certain aspects, optionally greater than or equal to about 1 wt. % to less than or equal to about 3 wt. %, of the second electrolyte additive. In certain variations, the second electrolyte additive may include, for example, fluoroethylene carbonate (FEC), vinylene carbonate (VC), 1,3,2-dioxathiolane 2,2-dioxide (DTD), 1,3-propone sulfone (PS), lithium bis(oxalato)borate ($LiB(C_2O_4)_2$) (LiBOB), lithium bis(fluorosulfonyl)imide ($LiN(FSO_2)_2$) (LiSFI), and/or lithium bis(trifluoromethanesulfonyl)imide (LiTFSI). The fluoroethylene carbonate (FEC) and/or vinylene carbonate (VC) may also be included as solvents, as discussed below.

In certain variations, the electrolyte 30 may be a non-aqueous liquid electrolyte solution (e.g., >1 M) that includes a lithium salt dissolved in a solvent or a mixture of solvents. A non-limiting list of lithium salts that may be dissolved in the solvent or mixture of solvents to form the non-aqueous liquid electrolyte solution include lithium hexafluorophosphate ($LiPF_6$), lithium perchlorate ($LiClO_4$), lithium tetrachloroaluminate ($LiAlCl_4$), lithium iodide (LiI), lithium bromide (LiBr), lithium thiocyanate (LiSCN), lithium tetrafluoroborate ($LiBF_4$), lithium tetraphenylborate ($LiB(C_6H_5)_4$), lithium bis(oxalato)borate ($LiB(C_2O_4)_2$) (LiBOB), lithium difluorooxalatoborate ($LiBF_2(C_2O_4)$), lithium hexafluoroarsenate ($LiAsF_6$), lithium trifluoromethanesulfonate ($LiCF_3SO_3$), lithium bis(trifluoromethane) sulfonylimide ($LiN(CF_3SO_2)_2$), lithium bis(fluorosulfonyl) imide ($LiN(FSO_2)_2$) (LiSFI), lithium bis (trifluoromethanesulfonyl)imide (LiTFSI), lithium difluoro (oxalato)borate (LiDFOB), and combinations thereof. These and other similar lithium salts may be dissolved in a variety of non-aqueous aprotic solvents, including but not limited to, various alkyl carbonates, such as cyclic carbonates (e.g., ethylene carbonate (EC), propylene carbonate (PC), butylene carbonate (BC), fluoroethylene carbonate (FEC), vinylene carbonate (VC), and the like), linear carbonates (e.g., dimethyl carbonate (DMC), diethyl carbonate (DEC), ethylmethylcarbonate (EMC), and the like), aliphatic carboxylic esters (e.g., methyl formate, methyl acetate, methyl propionate, and the like), γ-lactones (e.g., γ-butyrolactone, γ-valerolactone, and the like), chain structure ethers (e.g., 1,2-dimethoxyethane, 1-2-diethoxyethane, ethoxymethoxyethane, and the like), cyclic ethers (e.g., tetrahydrofuran, 2-methyltetrahydrofuran, 1,3-dioxolane, and the like), sulfur compounds (e.g., sulfolane), and combinations thereof. In certain variations, the solvent may be selected from the group consisting of: ethylene carbonate (EC), propylene carbonate (PC), butylene carbonate (BC), fluoroethylene carbonate (FEC), vinylene carbonate (VC), dimethyl carbonate (DMC), diethyl carbonate (DEC), ethylmethylcarbonate (EMC), methyl formate, methyl acetate, methyl propionate, γ-butyrolactone, γ-valerolactone, 1,2-dimethoxyethane, 1-2-diethoxyethane, ethoxymethoxyethane, tetrahydrofuran, 2-methyltetrahydrofuran, 1,3-dioxolane, sulfolane, and combinations thereof.

In certain variations, the solvent may include a mixture of solvents. For example, the electrolyte 30 may include a first solvent and a second solvent. The first and second solvents may be independently selected from the group consisting of: ethylene carbonate (EC), propylene carbonate (PC), butylene carbonate (BC), fluoroethylene carbonate (FEC), vinylene carbonate (VC), dimethyl carbonate (DMC), diethyl carbonate (DEC), ethylmethylcarbonate (EMC), methyl formate, methyl acetate, methyl propionate, γ-butyrolactone, γ-valerolactone, 1,2-dimethoxyethane, 1-2-diethoxyethane, ethoxymethoxyethane, tetrahydrofuran, 2-methyltetrahydrofuran, 1,3-dioxolane, sulfolane, and combinations thereof. For example, in certain variations, the first solvent may include ethylene carbonate (EC), and the second solvent may include dimethyl carbonate (DMC). In each instance, a volume ratio of the first solvent to the second solvent may be greater than or equal to about 1:9 to less than or equal to about 5:5, and in certain aspects, optionally about 3:7.

The separator 26 may be a porous separator. For example, in certain instances, the separator 26 may be a microporous polymeric separator including, for example, a polyolefin. The polyolefin may be a homopolymer (derived from a single monomer constituent) or a heteropolymer (derived from more than one monomer constituent), which may be either linear or branched. If a heteropolymer is derived from two monomer constituents, the polyolefin may assume any copolymer chain arrangement, including those of a block copolymer or a random copolymer. Similarly, if the polyolefin is a heteropolymer derived from more than two monomer constituents, it may likewise be a block copolymer or a random copolymer. In certain aspects, the polyolefin may be polyethylene (PE), polypropylene (PP), or a blend of polyethylene (PE) and polypropylene (PP), or multi-layered structured porous films of PE and/or PP. Commercially available polyolefin porous separator membranes 26 include CELGARD® 2500 (a monolayer polypropylene separator) and CELGARD® 2320 (a trilayer polypropylene/polyethylene/polypropylene separator) available from Celgard LLC.

When the separator 26 is a microporous polymeric separator, it may be a single layer or a multi-layer laminate, which may be fabricated from either a dry or a wet process. For example, in certain instances, a single layer of the polyolefin may form the entire separator 26. In other aspects, the separator 26 may be a fibrous membrane having an abundance of pores extending between the opposing surfaces and may have an average thickness of less than a millimeter, for example. As another example, however, multiple discrete layers of similar or dissimilar polyolefins may be assembled to form the microporous polymer separator 26. The separator 26 may also comprise other polymers in addition to the polyolefin such as, but not limited to, polyethylene terephthalate (PET), polyvinylidene fluoride (PVdF), a polyamide, polyimide, poly(amide-imide) copolymer, polyetherimide, and/or cellulose, or any other material suitable for creating the porous structure. The polyolefin layer, and any other optional polymer layers, may further be included in the separator 26 as a fibrous layer to help provide the separator 26 with appropriate structural and porosity characteristics.

In certain aspects, the separator 26 may further include one or more of a ceramic material and a heat-resistant material. For example, the separator 26 may also be admixed with the ceramic material and/or the heat-resistant material. The ceramic material and/or the heat-resistant material may be disposed on one or more sides of the separator 26. The ceramic material may be selected from the group consisting of: alumina ($Al_2O_3$), silica ($SiO_2$), and combinations thereof. The heat-resistant material may be selected from the group consisting of: NOMEX™ meta-aramid (e.g., an aromatic polyamide formed from a condensation reaction from monomers m-phenylenediamine and isophthaloyl chloride), ARAMID aromatic polyamide, and combinations thereof.

Various conventionally available polymers and commercial products for forming the separator 26 are contemplated, as well as the many manufacturing methods that may be employed to produce such a microporous polymer separator 26. For example, in certain variations, the separator 26 may be a polyolefin-based separator including, for example, polyacetylene, propylene (PP), and/or polyethylene (PE); a cellulose separator including, for example, polyvinylidene fluoride (PVDF) membrane and/or a porous polyimide membrane; and/or a high-temperature-stable separators including, for example, polyimide (PI) nanofiber-based nonwovens, nano-sized aluminum oxide ($Al_2O_3$) and poly (lithium 4-styrenesulfonate)-coated polyethylene membrane, silicon oxide ($SiO_2$) coated polyethylene (PE)

separator, co-polyimide-coated polyethylene separators, polyetherimides (PEI) (bisphenol-aceton diphthalic anhydride (BPADA) and para-phenylenediamine) separator, expanded polytetrafluoroethylene reinforced polyvinylidenefluoride-hexafluoropropylene separator, and/or sandwiched-structure polyvinylidene fluoride (PVDF)-poly (m-phenylene isophthalamide) (PMIA)-polyvinylidene fluoride (PVDF) separator. In each instance, the separator 26 may have an average thickness greater than or equal to about 1 micrometer (μm) to less than or equal to about 50 μm, and in certain instances, optionally greater than or equal to about 1 μm to less than or equal to about 20 μm; and the electrolyte 30 may wet greater than or equal to about 5 vol. % to less than or equal to about 100 vol. %, of a total porosity of the separator 26.

In various aspects, the porous separator 26 and/or the electrolyte 30 disposed in the porous separator 26 as illustrated in FIG. 1 may be replaced with a solid-state electrolyte ("SSE") and/or semi-solid electrolyte (e.g., gel) that functions as both an electrolyte and a separator. For example, the solid-state electrolyte and/or semi-solid-state electrolyte may be disposed between the positive electrode 24 and negative electrode 22. The solid-state electrolyte and/or semi-solid-state electrolyte facilitates transfer of lithium ions, while mechanically separating and providing electrical insulation between the negative and positive electrodes 22, 24.

The solid-state electrolyte and/or semi-solid electrolyte may include a plurality of solid-state electrolyte particles. In certain variations, the electrolyte 30 may at least partially fill voids (e.g., interparticle porosity) between the solid-state electrolyte particles defining the separator 26. In each variation, the solid-state electrolyte particles may include, for example, oxide-based solid-state particles (such as garnet type solid-state particles (e.g., $Li_7La_3Zr_2O_{12}$ (LLZO)), perovskite type solid-state particles (e.g., $Li_{3x}La_{2/3-x}TiO_3$, where $0<x<0.167$), NASICON type solid-state particles (e.g., $Li_{1.4}Al_{0.4}Ti_{1.6}(PO_4)_3$, $Li_{1+x}Al_xGe_{2-x}(PO_4)_3$ (where $0 \le x \le 2$) (LAGP)), and/or LISICON type solid-state particles (e.g., $Li_{2+2x}Zn_{1-x}GeO_4$, where $0<x<1$)), metal-doped or aliovalent-substituted oxide solid-state particles (such as aluminum (Al) or niobium (Nb) doped $Li_7La_3Zr_2O_{12}$, antimony (Sb) doped $Li_7La_3Zr_2O_{12}$, gallium (Ga) substituted $Li_7La_3Zr_2O_{12}$, chromium (Cr) and/or vanadium (V) substituted $LiSn_2P_3O_{12}$, and/or aluminum (Al) substituted $Li_{1+x+y}Al_xTi_{2-x}Si_yP_{3-y}O_{12}$ (where $0<x<2$ and $0<y<3$)), sulfide-based solid-state particles (such as $Li_2S—P_2S_5$ systems (e.g., $Li_3PS_4$, $Li_7P_3S_{11}$, and $Li_{9.6}P_3S_{12}$), $Li_2S—SnS_2$ systems (e.g., $Li_4SnS_4$), $Li_{10}GeP_2S_{12}$ (LGPS), $Li_{3.25}Ge_{0.25}P_{0.75}S_4$ (thio-LISICON), $Li_{3.4}Si_{0.4}P_{0.6}S_4$, $Li_{10}GeP_2S_{11.7}O_{0.3}$, lithium argyrodite ($Li_6PS_5X$, where X is CL, Br, or I), $Li_{9.54}Si_{1.74}P_{1.44}S_{11.7}Cl_{0.3}$, $Li_{9.6}P_3S_{12}$, $Li_7P_3S_{11}$, $Li_9P_3S_9O_3$, $Li_{10.35}Ge_{1.35}P_{1.65}S_{12}$, $Li_{10.35}Si_{1.35}P_{1.65}S_{12}$, $Li_{9.81}Sn_{0.81}P_{2.18}S_{12}$, $Li_{10}(Si_{0.5}Ge_{0.5})P_2S_{12}$, $Li_{10}(Ge_{0.5}Sn_{0.5})P_2S_{12}$, $Li_{10}(Si_{0.5}Sn_{0.5})P_2S_{12}$, $Li_{3.933}Sn_{0.833}As_{0.166}S_4$, $LiI—Li_4SnS_4$, and/or $Li_4SnS_4$), nitride-based solid-state particles (such as $Li_3N$, $Li_7PN_4$, and/or $LiSi_2N_3$), hydride-based solid-state particles (such as $LiBH_4$, $LiBH_4—LiX$ (where X=Cl, Br, or I), $LiNH_2$, $Li_2NH$, $LiBH_4—LiNH_2$, and/or $Li_3AlH_6$), halide-based solid-state particles (such as $Li_3YCl_6$, $Li_3InCl_6$, $Li_3YBr_6$, LiI, $Li_2CdC_{14}$, $Li_2MgCl_4$, $LiCdI_4$, $Li_2ZnI_4$, and/or $Li_3OCl$), and/or borate-based solid-state particles ($Li_2B_4O_7$ and/or $Li_2O—B_2O_3—P_2O_5$). In each instance, the solid-state electrolyte includes the electrolyte additive (e.g., phosphite-type additive) as detailed above.

The semi-solid electrolyte may include a polymer host and a liquid electrolyte. The polymer host may include, for example, polyvinylidene fluoride (PVDF), polyvinylidene fluoride-hexafluoropropylene (PVDF-HFP), polyethylene oxide (PEO), polypropylene oxide (PPO), polyacrylonitrile (PAN), polymethacrylonitrile (PMAN), polymethyl methacrylate (PMMA), carboxymethyl cellulose (CMC), poly (vinyl alcohol) (PVA), polyvinylpyrrolidone (PVP), and combinations thereof. The liquid electrolyte may be like the electrolyte 30 detailed above. In certain variations, the semi-solid or gel electrolyte may also be found in the negative electrode 22 and/or positive electrode 24. In each instance, semi-solid-state electrolyte includes the electrolyte additive (e.g., phosphite-type additive) as detailed above.

With renewed reference to FIG. 1, the negative electrode 22 is formed from a lithium host material that is capable of functioning as a negative terminal of a lithium-ion battery. In various aspects, the negative electrode 22 may be defined by a plurality of negative electroactive material particles. The negative electroactive material particles may be disposed in one or more layers so as to define the three-dimensional structure of the negative electrode 22. The electrolyte 30 may be introduced, for example after cell assembly, and contained within pores of the negative electrode 22 (i.e., within voids or spaces between the negative electroactive material particles). In certain variations, the negative electrode 22 may include a plurality of solid-state electrolyte particles dispersed with the negative electroactive material particles and the electrolyte 30 may at least partially file voids or spaces between the negative electroactive material particles and the solid-state electrolyte particles. In each instance, the negative electrode 22 may have an average thickness greater than or equal to about 30 μm to less than or equal to about 500 μm, and in certain aspects, optionally greater than or equal to about 50 μm to less than or equal to about 100 μm.

In certain variations, the negative electroactive material particles may include silicon-containing (or silicon-based) electroactive materials. The silicon-containing electroactive materials may include silicon, lithium-silicon alloys, and other silicon-containing binary and/or ternary alloys. For example, in certain variations, the silicon-containing electroactive material may include elemental silicon (Si), various lithium silicide phases ($Li_xSi_y$, where $0<x<17$ and $1<y<4$), silicon nanograins embedded in a silicon oxide ($SiO_x$, where $0<x<2$) matrix, lithium doped silicon oxide ($Li_ySiO_x$, where $0<x<2$ and $0<y<1$), and combinations thereof. In certain variations, the silicon-containing electroactive materials may be provided as nano-particles, nano-fibers, nano-tubes, and/or micro-particles.

In certain variations, the negative electrode 22 may be a composite electrode including a combination of negative electroactive materials. For example, the negative electrode 22 may include a first negative electroactive material and a second negative electroactive material. A ratio of the first negative electroactive material to the second negative electroactive material may be greater than or equal to about 5:95 to less than or equal to about 95:5. In certain variations, the first negative electroactive material may be a volume-expanding material including, for example, silicon (such as lithium doped silicon oxide ($Li_ySiO_x$, where $0<x<2$ and $0<y<1$)); and the second negative electroactive material may include a carbonaceous material (e.g., graphite, hard carbon, and/or soft carbon). In certain variations, the negative electrode 22 may include greater than or equal to about 10 wt. % to less than or equal to about 50 wt. % of the silicon-containing electroactive material and greater than or equal to about 40 wt. % to less than or equal to about 90 wt. %, and in certain aspects, optionally greater than or equal to about 40 wt. % to less than or equal to about 80 wt. %, of the carbonaceous electroactive material.

In each variation, the negative electroactive material may be optionally intermingled with an electronically conductive material (i.e. conductive additive) that provides an electron conductive path and/or a polymeric binder material that improves the structural integrity of the negative electrode 22. For example, the negative electrode 22 may include greater than or equal to about 30 wt. % to less than or equal to about 98 wt. %, and in certain aspects, optionally greater than or equal to about 60 wt. % to less than or equal to about 95 wt. %, of the negative electroactive material; greater than or equal to 0 wt. % to less than or equal to about 30 wt. %, optionally greater than 0 wt. % to less than or equal to about 30 wt. %, and in certain aspects, optionally greater than or equal to about 0.5 wt. % to less than or equal to about 10 wt. %, of the electronically conducting material; and greater than or equal to 0 wt. % to less than or equal to about 20 wt. %, optionally greater than 0 wt. % to less than or equal to about 20 wt. %, and in certain aspects, optionally greater than or equal to about 0.5 wt. % to less than or equal to about 10 wt. %, of the polymeric binder.

Example polymeric binders include polyimide, polyamic acid, polyamide, polysulfone, polyvinylidene difluoride (PVdF), poly(vinylidene fluoride-co-hexafluoropropylene (PVdF-HFP), polytetrafluoroethylene (PTFE), polyacrylic acid (PAA), polychlorotrifluoroethylene, ethylene propylene diene monomer (EPDM) rubber, carboxymethyl cellulose (CMC), nitrile butadiene rubber (NBR), styrene-butadiene rubber (SBR), lithium polyacrylate (LiPAA), sodium polyacrylate (NaPAA), sodium alginate, lithium alginate, and/or styrene copolymers (SEBS). Electronically conducting materials may include, for example, carbon-based materials, powdered nickel or other metal particles, or conductive polymers. Carbon-based materials may include, for example, particles of graphite, acetylene black (such as KETCHEN™ black or DENKA™ black), carbon nanofibers and nanotubes (e.g., single wall carbon nanotubes (SWCNT), multiwall carbon nanotubes (MWCNT)), graphene (e.g., graphene platelets (GNP), oxidized graphene platelets), conductive carbon blacks (such as, SuperP (SP)), and the like. Examples of a conductive polymer include polyaniline, polythiophene, polyacetylene, polypyrrole, and the like.

In each variation, the negative electrode 22 may have a porosity greater than or equal to about 20 vol. % to less than or equal to about 45 vol. %. The negative electrode 22 may have a capacity loading greater than or equal to about 4.4 $mAh/cm^2$ to less than or equal to about 6.05 $mAh/cm^2$ for a one-sided coating at 0.1 capacity (C) at room temperature (i.e., greater than or equal to about 20° C. to less than or equal to about 25° C.). A pressing density of the negative electrode 22 may be greater than or equal to about 1.4 $g/cm^3$ to less than or equal to about 1.8 $g/cm^3$, and in certain aspects, optionally about 1.6 $g/cm^3$. The negative electrode 22 may also have a moisture content of less than about 500 ppm, prior to the introduction of the electrolyte 30.

The positive electrode 24 is formed from a lithium-based active material that is capable of undergoing lithium intercalation and deintercalation, alloying and dealloying, or plating and stripping, while functioning as the positive terminal of a lithium-ion battery. The positive electrode 24 can be defined by a plurality of electroactive material particles. Such positive electroactive material particles may be disposed in one or more layers so as to define the three-dimensional structure of the positive electrode 24. The electrolyte 30 may be introduced, for example after cell assembly, and contained within pores of the positive electrode 24 (i.e., within voids or spaces between the positive electroactive material particles). In certain variations, the positive electrode 24 may include a plurality of solid-state electrolyte particles dispersed with the positive electroactive material particles and the electrolyte 30 may at least partially file voids or spaces between the positive electroactive material particles and the solid-state electrolyte particles. In each instance, the positive electrode 24 may have an average thickness greater than or equal to about 30 μm to less than or equal to about 500 μm, and in certain aspects, optionally greater than or equal to about 50 μm to less than or equal to about 100 μm.

In various aspects, the positive electroactive material includes a layered oxide represented by $LiMeO_2$, where Me is a transition metal, such as cobalt (Co), nickel (Ni), manganese (Mn), iron (Fe), aluminum (Al), vanadium (V), or combinations thereof. In other variations, the positive electroactive material includes an olivine-type oxide represented by $LiMePO_4$, where Me is a transition metal, such as cobalt (Co), nickel (Ni), manganese (Mn), iron (Fe), aluminum (Al), vanadium (V), or combinations thereof. In still other variations, the positive electroactive material includes a monoclinic-type oxide represented by $Li_3Me_2(PO_4)_3$, where Me is a transition metal, such as cobalt (Co), nickel (Ni), manganese (Mn), iron (Fe), aluminum (Al), vanadium (V), or combinations thereof. In still other variations, the positive electroactive material includes a spinel-type oxide represented by $LiMe_2O_4$, where Me is a transition metal, such as cobalt (Co), nickel (Ni), manganese (Mn), iron (Fe), aluminum (Al), vanadium (V), or combinations thereof. In still other variations, the positive electroactive material includes a favorite represented by $LiMeSO_4F$ and/or $LiMePO_4F$, where Me is a transition metal, such as cobalt (Co), nickel (Ni), manganese (Mn), iron (Fe), aluminum (Al), vanadium (V), or combinations thereof. In still further variations, the positive electrode 24 may be a composite electrode including a combination of positive electroactive materials. For example, the positive electrode 24 may include a first positive electroactive material and a second electroactive material. A mass ratio of the first positive electroactive material to the second positive electroactive material may be greater than or equal to about 5:95 to less than or equal to about 95:5. In certain variations, the first and second electroactive materials may be independently selected from one or more layered oxides, one or more olivine-type oxides, one or more monoclinic-type oxides, one or more spinel-type oxide, one or more favorite, or combinations thereof.

In each variation, the positive electroactive material may be optionally intermingled (e.g., slurry casted) with an electronically conductive material (i.e., conductive additive) that provides an electron conductive path and/or a polymeric binder material that improves the structural integrity of the positive electrode 24. For example, the positive electrode 24 may include greater than or equal to about 70 wt. % to less than or equal to about 98 wt. %, and in certain aspects, optionally greater than or equal to about 80 wt. % to less than or equal to about 97 wt. %, of the positive electroactive material; greater than or equal to 0 wt. % to less than or equal to about 30 wt. %, optionally greater than 0 wt. % to less than or equal to about 30 wt. %, and in certain aspects, optionally greater than or equal to about 0.5 wt. % to less than or equal to about 10 wt. %, of the electrically conducting material; and greater than or equal to 0 wt. % to less than or equal to about 20 wt. %, optionally greater than 0 wt. % to less than or equal to about 20 wt. %, and in certain aspects, optionally greater than or equal to about 0.5 wt. % to less than or equal to about 10 wt. %, of the polymeric binder. The conductive additive and/or binder as included in the positive electrode 24 may be the same as or different from the conductive additive and/or binder as included in the negative electrode 22.

Certain features of the current technology are further illustrated in the following non-limiting examples.

Example 1

Example batteries and battery cells may be prepared in accordance with various aspects of the present disclosure.

For example, an example cell 210 may include a first electrolyte including a phosphite-type additive. For example, the first electrolyte may include about 1 wt. % of tris(trimethylsilyl)phosphite (TMSPI). The first electrolyte may also include 1M lithium hexafluorophosphate ($LiPF_6$) and a solvent system including ethylene carbonate (EC) and dimethyl carbonate (DMC) in a mass ratio of about 3:7. The first electrolyte may also include one or more secondary additives. For example, the first electrolyte may include about 2 wt. % of fluoroethylene carbonate (FEC) and about 1 wt. % of vinylene carbonate (VC).

A comparative cell 220 may include a second electrolyte that omits the phosphite-type additive. The second electrolyte may include 1M lithium hexafluorophosphate ($LiPF_6$) and a solvent system including ethylene carbonate (EC) and dimethyl carbonate (DMC) in a mass ratio of about 3:7. Like the first electrolyte, the second electrolyte may also include one or more secondary additives. For example, the first electrolyte may include about 2 wt. % of fluoroethylene carbonate (FEC) and about 1 wt. % of vinylene carbonate (VC).

The example cell 210 and the comparative cell 220 may each include a positive electrode including a positive electroactive material and a negative electrode including a negative electroactive material. The positive electroactive material may include, for example, NCMA. The negative electroactive material may include a first negative electroactive material and a second negative electroactive material. For example, the negative electroactive material may include about 20 wt. % of the first negative electroactive material and about 80 wt. % of the second negative electroactive material. The first negative electroactive material may include lithium doped silicon oxide ($Li_ySiO_x$, where 0<y<1 and 0<x<2 (LSO)), and the second negative electroactive material may include graphite.

Figure 2A:
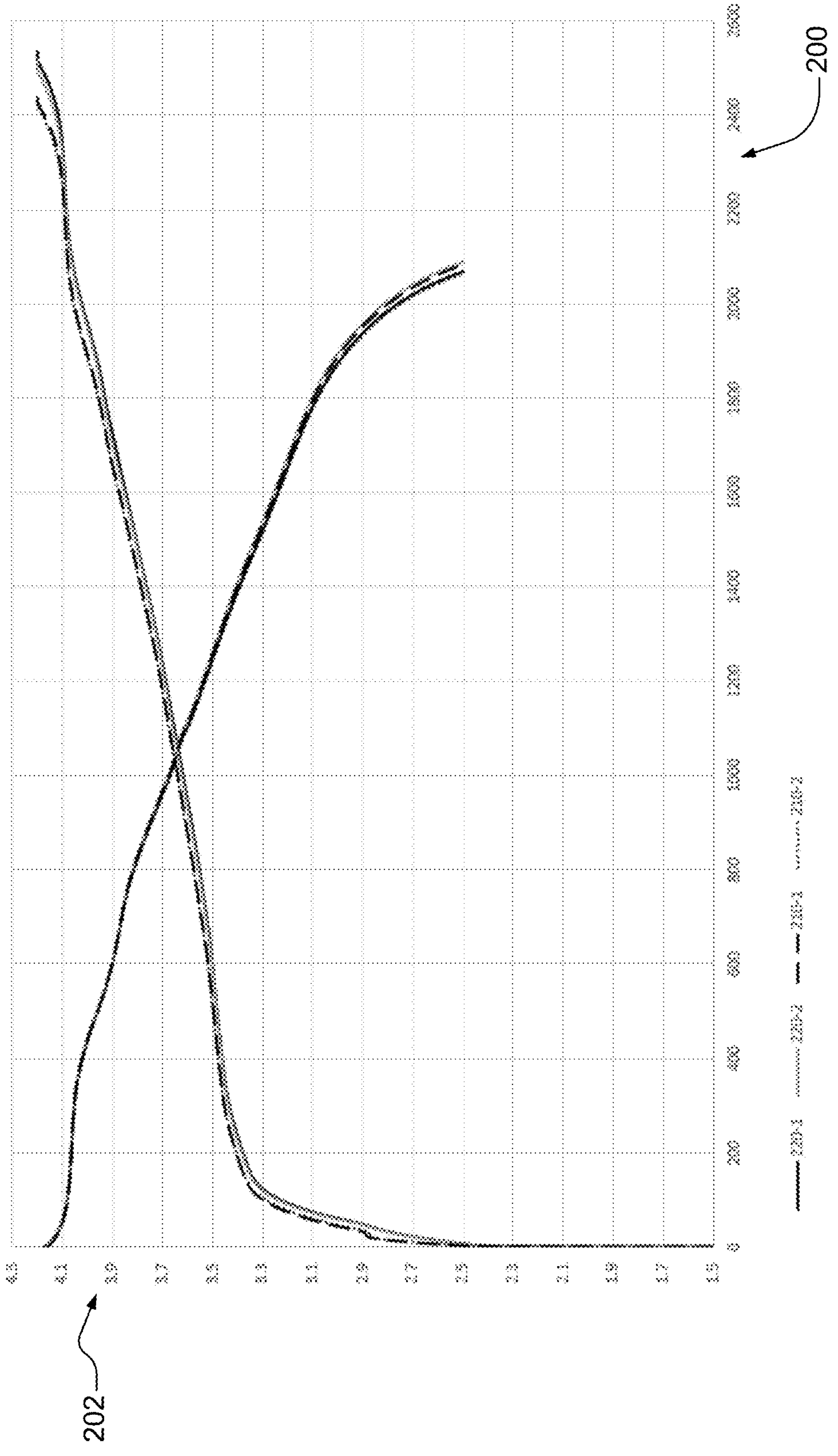
FIG. 2A is a graphical illustration demonstrating cycling performance of an example cell including an electrolyte in accordance with various aspects of the present disclosure.
Figure 2B:
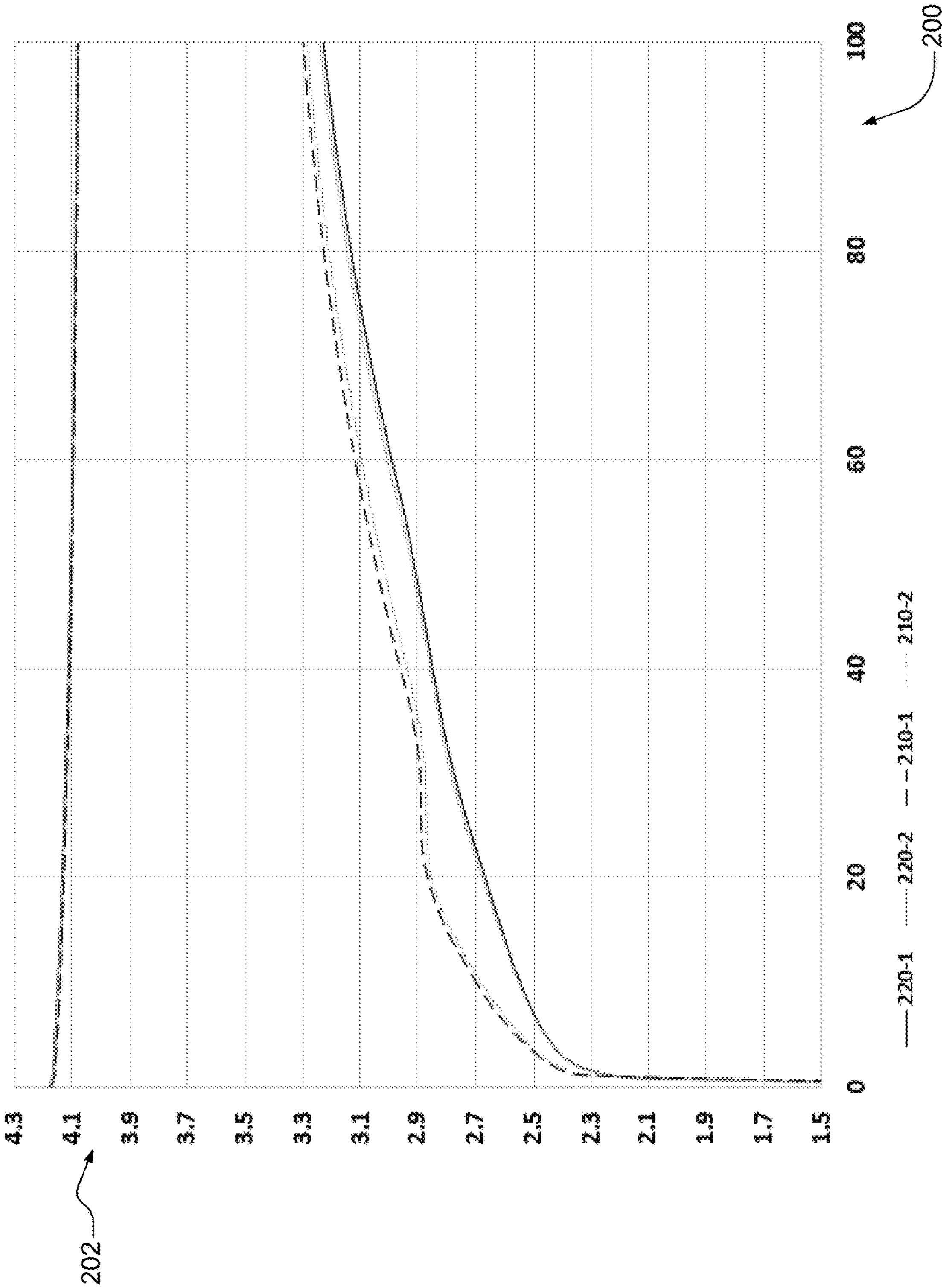
FIG. 2B is an enlarged view of a portion of the graphical illustration of FIG. 2A.

FIG. 2A is a graphical illustration demonstrating the formation cycle of the example cell 210 as compared to the comparative cell 220, where the x-axis 200 represents capacity (mAh), and the y-axis 202 represents voltage (V). FIG. 2B is an enlarged view of a portion of the graphical illustration of FIG. 2A. As illustrated, example cell 210 including the phosphite-type additive in accordance with various aspects of the present disclosure has improved columbic efficiency as compared to the comparative cell 220. For example, the example cell 210 may have a columbic efficiency of about 85.13% or about 84.71%, while the comparative cell 220 has a columbic efficiency of about 81.61% or about 82.98%.

Figure 3A:
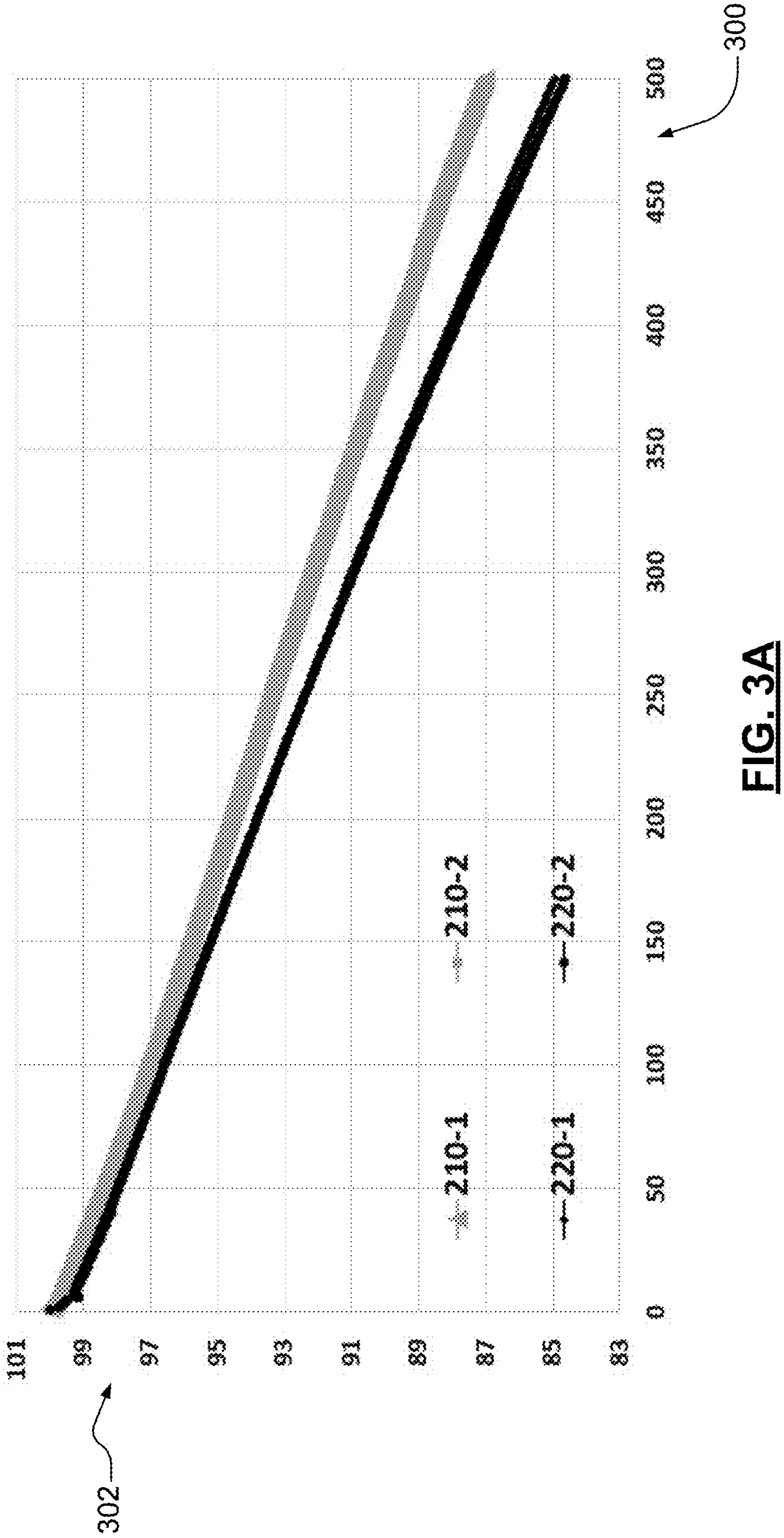
FIG. 3A is a graphical illustration demonstrating cycling performance of an example cell including an electrolyte in accordance with various aspects of the present disclosure.
Figure 3B:
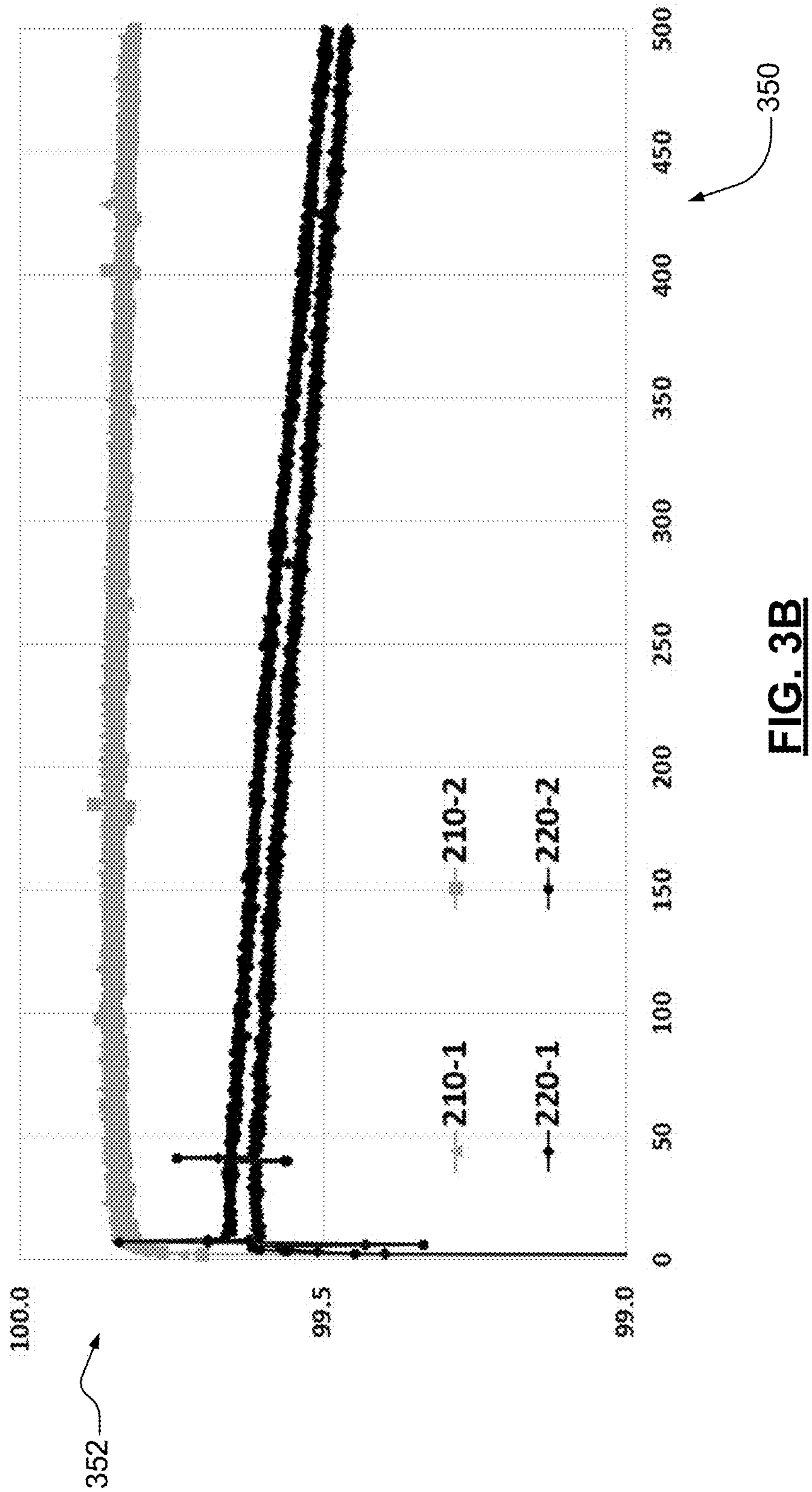
FIG. 3B is a graphical illustration demonstrating cycling performance of an example cell including an electrolyte in accordance with various aspects of the present disclosure.

FIGS. 3A and 3B represent cycle tests for the example cell 210 as compared to the comparative cell 220. FIG. 3A demonstrates cycling performance, where the x-axis 300 represents cycle number, and the y-axis 302 represents discharge capacity retention (%). FIG. 3B demonstrates cycling performance, where the x-axis 350 represents cycle number, and the y-axis 352 represents columbic efficiency (%). As illustrated, the example cell 210 has improved capacity retention and columbic efficiency, as well as reduced swelling. For example, the example cell 210 has a capacity retention after 500 cycles of about 87.02% or about 87.01%, while the comparative cell 220 has a capacity retention after 500 cycles of about 84.94% or about 84.63%. The example cell 210 has an average columbic efficiency of about 99.84% or about 99.82%, while the comparative cell 220 has a columbic efficiency of about 99.54% or about 99.57%. The example cell 210 has a swelling ratio after 500 cycles of about 5.9 or about 5.8, while the comparative cell 220 has a swelling ratio after 500 cycles of about 6.0 or about 6.7.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An electrode for an electrochemical cell that cycles lithium ions, the electrode comprising:

a silicon-containing electroactive material; and an electrolyte comprising greater than or equal to about 0.1 wt. % to less than or equal to about 10 wt. % of a phosphite-type additive represented by:

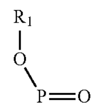

where $R_1$ is selected from trimethylsilyl, linear or branched alkyl ($C_nH_{2n+1}$, where 1≤n≤20), linear or branched alkene ($C_nH_{2n}$, where 1≤n≤20), linear or branched $C_nM_{2n+1}$ (where 1≤n≤20 and M is selected from the group consisting of: fluorine (F), chlorine (Cl), bromine (Br), iodine (I), astatine (At), and combinations thereof), linear or branched $C_nM_{2n}$ (where 1≤n≤20 and M is selected from the group consisting of: fluorine (F), chlorine (Cl), bromine (Br), iodine (I), astatine (At), and combinations thereof), phenyl group, mono-substituted phenyl group where the substituted group is a linear or branched alkyl ($C_nH_{2n+1}$, where 1≤n≤20), di-substituted phenyl group where the substituted groups comprise a linear or branched alkyl ($C_nH_{2n+1}$, where 1≤n≤20), tri-substituted phenyl group where the substituted groups comprise a linear or branched alkyl ($C_nH_{2n+1}$, where 1≤n≤20), nitrogen, cyanogen, fluorine (F), chlorine (Cl), bromine (Br), iodine (I), and astatine (At).

2. The electrode of claim 1, wherein the phosphite-type additive is a first phosphite-type additive and the electrolyte further comprises a second phosphite-type additive represented by:

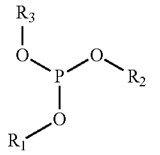

where $R_1$, $R_2$, and $R_3$ are independently selected from trimethylsilyl, linear or branched alkyl ($C_nH_{2n+1}$, where $1 \leq n \leq 20$), linear or branched alkene ($C_nH_{2n}$, where $1 \leq n \leq 20$), linear or branched $C_nM_{2n+1}$ (where $1 \leq n \leq 20$ and M is selected from the group consisting of: fluorine (F), chlorine (Cl), bromine (Br), iodine (I), astatine (At), and combinations thereof), linear or branched $C_nM_{2n}$ (where $1 \leq n \leq 20$ and M is selected from the group consisting of: fluorine (F), chlorine (Cl), bromine (Br), iodine (I), astatine (At), and combinations thereof), phenyl group, mono-substituted phenyl group where the substituted group is a linear or branched alkyl ($C_nH_{2n+1}$, where $1 \leq n \leq 20$), di-substituted phenyl group where the substituted groups comprise a linear or branched alkyl ($C_nH_{2n+1}$, where $1 \leq n \leq 20$), tri-substituted phenyl group where the substituted groups comprise a linear or branched alkyl ($C_nH_{2n+1}$, where $1 \leq n \leq 20$), nitrogen, cyanogen, fluorine (F), chlorine (Cl), bromine (Br), iodine (I), and astatine (At).

3. The electrode of claim 2, wherein $R_1$ is trimethylsilyl.

4. The electrode of claim 2, wherein the second phosphite-type additive is selected from the group consisting of: tris(trimethylsilyl)phosphite (TMSPI), dimethyl trimethylsilyl phosphite, tris(2,2,2 trifluoroethyl) phosphite, and combinations thereof.

5. The electrode of claim 1, wherein the electrolyte further comprises:

a lithium salt selected from the group consisting of: lithium hexafluorophosphate ($LiPF_6$), lithium perchlorate ($LiClO_4$), lithium tetrachloroaluminate ($LiAlCl_4$), lithium iodide (LiI), lithium bromide (LiBr), lithium thiocyanate (LiSCN), lithium tetrafluoroborate ($LiBF_4$), lithium tetraphenylborate ($LiB(C_6H_5)_4$), lithium bis(oxalato)borate ($LiB(C_2O_4)_2$) (LiBOB), lithium difluorooxalatoborate ($LiBF_2(C_2O_4)$), lithium hexafluoroarsenate ($LiAsF_6$), lithium trifluoromethanesulfonate ($LiCF_3SO_3$), lithium bis(trifluoromethane) sulfonylimide ($LiN(CF_3SO_2)_2$), lithium bis(fluorosulfonyl)imide ($LiN(FSO_2)_2$) (LiSFI), lithium bis (trifluoromethanesulfonyl)imide (LiTFSI), lithium difluoro(oxalato)borate (LiDFOB), and combinations thereof; and a solvent selected from the group consisting of: ethylene carbonate (EC), propylene carbonate (PC), butylene carbonate (BC), fluoroethylene carbonate (FEC), vinylene carbonate (VC), dimethyl carbonate (DMC), diethyl carbonate (DEC), ethylmethylcarbonate (EMC), methyl formate, methyl acetate, methyl propionate, γ-butyrolactone, γ-valerolactone, 1,2-dimethoxyethane, 1-2-diethoxyethane, ethoxymethoxyethane, tetrahydrofuran, 2-methyltetrahydrofuran, 1,3-dioxolane, sulfolane, and combinations thereof.

6. The electrode of claim 5, wherein the solvent comprises a first solvent and a second solvent in a mass ratio greater than or equal to about 1:9 to less than or equal to about 5:5.

7. The electrode of claim 6, wherein the first solvent comprises ethylene carbonate (EC) and the second solvent comprises dimethyl carbonate (DMC).

8. The electrode of claim 1, wherein the electrolyte further comprises greater than or equal to about 0.5 wt. % to less than or equal to about 10 wt. % of a secondary additive selected from the group consisting of: fluoroethylene carbonate (FEC), vinylene carbonate (VC), 1,3,2-dioxathiolane 2,2-dioxide (DTD), 1,3-propone sulfone (PS), lithium bis (oxalato)borate ($LiB(C_2O_4)_2$) (LiBOB), lithium bis(fluorosulfonyl)imide ($LiN(FSO_2)_2$) (LiSFI), lithium bis(trifluoromethanesulfonyl)imide (LiTFSI) and combinations thereof.

9. The electrode of claim 8, wherein the electrolyte comprises a first secondary additive comprising fluoroethylene carbonate (FEC) and a second secondary additive comprising vinylene carbonate (VC).

10. The electrode of claim 1, wherein the silicon-containing electroactive material comprises $Li_ySiO_x$, where $0<y<1$ and $0<x<2$.

11. The electrode of claim 1, wherein the electrode further comprises a carbonaceous electroactive material.

12. An electrochemical cell that cycles lithium ions, the electrochemical cell comprising:

a positive electrode comprising a positive electroactive material;

a negative electrode comprising a silicon-containing negative electroactive material;

a separating layer disposed between the positive electrode and the negative electrode; and an electrolyte in contact with at least one of the positive electroactive material, the negative electroactive material, and the separating layer, the electrolyte comprising greater than or equal to about 0.1 wt. % to less than or equal to about 10 wt. % of a phosphite-type additive represented by:

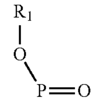

where $R_1$ is selected from trimethylsilyl, linear or branched alkyl ($C_nH_{2n+1}$, where $1 \leq n \leq 20$), linear or branched alkene ($C_nH_{2n}$, where $1 \leq n \leq 20$), linear or branched $C_nM_{2n+1}$ (where $1 \leq n \leq 20$ and M is selected from the group consisting of: fluorine (F), chlorine (Cl), bromine (Br), iodine (I), astatine (At), and combinations thereof), linear or branched $C_nM_{2n}$ (where $1 \leq n \leq 20$ and M is selected from the group consisting of: fluorine (F), chlorine (Cl), bromine (Br), iodine (I), astatine (At), and combinations thereof), phenyl group, mono-substituted phenyl group where the substituted group is a linear or branched alkyl ($C_nH_{2n+1}$, where $1 \leq n \leq 20$), di-substituted phenyl group where the substituted groups comprise a linear or branched alkyl ($C_nH_{2n+1}$, where $1 \leq n \leq 20$), tri-substituted phenyl group where the substituted groups comprise a linear or branched alkyl ($C_nH_{2n+1}$, where $1 \leq n \leq 20$), nitrogen, cyanogen, fluorine (F), chlorine (Cl), bromine (Br), iodine (I), and astatine (At).

13. The electrochemical cell of claim 12, wherein the phosphite-type additive is a first phosphite-type additive and the electrolyte further comprises a second phosphite-type additive represented by:

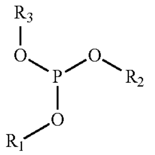

where $R_1$, $R_2$, and $R_3$ are independently selected from trimethylsilyl, linear or branched alkyl ($C_nH_{2n+1}$, where $1 \leq n \leq 20$), linear or branched alkene ($C_nH_{2n}$, where $1 \leq n \leq 20$), linear or branched $C_nM_{2n+1}$ (where $1 \leq n \leq 20$ and M is selected from the group consisting of: fluorine (F), chlorine (Cl), bromine (Br), iodine (I), astatine (At), and combinations thereof), linear or branched $C_nM_{2n}$ (where $1 \leq n \leq 20$ and M is selected from the group consisting of: fluorine (F), chlorine (Cl), bromine (Br), iodine (I), astatine (At), and combinations thereof), phenyl group, mono-substituted phenyl group where the substituted group is a linear or branched alkyl ($C_nH_{2n+1}$, where $1 \leq n \leq 20$), di-substituted phenyl group where the substituted groups comprise a linear or branched alkyl ($C_nH_{2n+1}$, where $1 \leq n \leq 20$), tri-substituted phenyl group where the substituted groups comprise a linear or branched alkyl ($C_nH_{2n}$+1, where $1 \leq n \leq 20$), nitrogen, cyanogen, fluorine (F), chlorine (Cl), bromine (Br), iodine (I), and astatine (At).

14. The electrochemical cell of claim 12, wherein the electrolyte further comprises:

a lithium salt selected from the group consisting of: lithium hexafluorophosphate ($LiPF_6$), lithium perchlorate ($LiClO_4$), lithium tetrachloroaluminate ($LiAlCl_4$), lithium iodide (LiI), lithium bromide (LiBr), lithium thiocyanate (LiSCN), lithium tetrafluoroborate ($LiBF_4$), lithium tetraphenylborate ($LiB(C_6H_5)_4$), lithium bis(oxalato)borate ($LiB(C_2O_4)_2$) (LiBOB), lithium difluorooxalatoborate ($LiBF_2(C_2O_4)$), lithium hexafluoroarsenate ($LiAsF_6$), lithium trifluoromethanesulfonate ($LiCF_3SO_3$), lithium bis(trifluoromethane) sulfonylimide ($LiN(CF_3SO_2)_2$), lithium bis(fluorosulfonyl)imide ($LiN(FSO_2)_2$) (LiSFI), lithium bis (trifluoromethanesulfonyl)imide (LiTFSI), lithium difluoro(oxalato)borate (LiDFOB), and combinations thereof; and a solvent selected from the group consisting of: ethylene carbonate (EC), propylene carbonate (PC), butylene carbonate (BC), fluoroethylene carbonate (FEC), vinylene carbonate (VC), dimethyl carbonate (DMC), diethyl carbonate (DEC), ethylmethylcarbonate (EMC), methyl formate, methyl acetate, methyl propionate, γ-butyrolactone, γ-valerolactone, 1,2-dimethoxyethane, 1-2-diethoxyethane, ethoxymethoxyethane, tetrahydrofuran, 2-methyltetrahydrofuran, 1,3-dioxolane, sulfolane, and combinations thereof.

15. The electrochemical cell of claim 12, wherein the electrolyte further comprises greater than or equal to about 0.5 wt. % to less than or equal to about 10 wt. % of a secondary additive selected from the group consisting of: fluoroethylene carbonate (FEC), vinylene carbonate (VC), 1,3,2-dioxathiolane 2,2-dioxide (DTD), 1,3-propone sulfone (PS), lithium bis(oxalato)borate ($LiB(C_2O_4)_2$) (LiBOB), lithium bis(fluorosulfonyl)imide ($LiN(FSO_2)_2$) (LiSFI), lithium bis(trifluoromethanesulfonyl)imide (LiTFSI), and combinations thereof.

16. The electrochemical cell of claim 12, wherein the silicon-containing electroactive material comprises $Li_ySiO_x$, where $0<y<1$ and $0<x<2$.

17. An electrochemical cell that cycles lithium ions, the electrochemical cell comprising:

a positive electrode comprising a positive electroactive material;

a negative electrode comprising a negative electroactive material, the negative electroactive material comprising $Li_ySiO_x$ (where $0<y<1$ and $0<x<2$) and a carbonaceous electroactive material;

a separating layer disposed between the positive electrode and the negative electrode; and an electrolyte in contact with at least one of the positive electroactive material, the negative electroactive material, and the separating layer, the electrolyte comprising greater than or equal to about 0.1 wt. % to less than or equal to about 10 wt. % of a phosphite-type additive represented by:

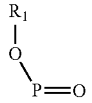

where $R_1$ is selected from trimethylsilyl, linear or branched alkyl ($C_nH_{2n+1}$, where $1 \leq n \leq 20$), linear or branched alkene ($C_nH_{2n}$, where $1 \leq n \leq 20$), linear or branched $C_nM_{2n+1}$ (where $1 \leq n \leq 20$ and M is selected from the group consisting of: fluorine (F), chlorine (Cl), bromine (Br), iodine (I), astatine (At), and combinations thereof), linear or branched $C_nM_{2n}$ (where $1 \leq n \leq 20$ and M is selected from the group consisting of: fluorine (F), chlorine (Cl), bromine (Br), iodine (I), astatine (At), and combinations thereof), phenyl group, mono-substituted phenyl group where the substituted group is a linear or branched alkyl ($C_nH_{2n+1}$, where $1 \leq n \leq 20$), di-substituted phenyl group where the substituted groups comprise a linear or branched alkyl ($C_nH_{2n+1}$, where $1 \leq n \leq 20$), tri-substituted phenyl group where the substituted groups comprise a linear or branched alkyl ($C_nH_{2n+1}$, where $1 \leq n \leq 20$), nitrogen, cyanogen, fluorine (F), chlorine (Cl), bromine (Br), iodine (I), and astatine (At).

18. The electrochemical cell of claim 17, wherein the phosphite-type type additive is a first phosphite-type additive and the electrolyte further comprises a second phosphite-type additive represented by:

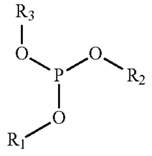

where $R_1$, $R_2$, and $R_3$ are independently selected from trimethylsilyl, linear or branched alkyl ($C_nH_{2n+1}$, where $1 \leq n \leq 20$), linear or branched alkene ($C_nH_{2n}$, where $1 \leq n \leq 20$), linear or branched $C_nM_{2n+1}$ (where $1 \leq n \leq 20$ and M is selected from the group consisting of: fluorine (F), chlorine (Cl), bromine (Br), iodine (I), astatine (At), and combinations thereof), linear or branched $C_nM_{2n}$ (where $1 \leq n \leq 20$ and M is selected from the group consisting of: fluorine (F), chlorine (Cl), bromine (Br), iodine (I), astatine (At), and combinations thereof), phenyl group, mono-substituted phenyl group where the substituted group is a linear or branched alkyl ($C_nH_{2n+1}$, where 1≤n≤20), di-substituted phenyl group where the substituted groups comprise a linear or branched alkyl ($C_nH_{2n+1}$, where 1≤n≤20), tri-substituted phenyl group where the substituted groups comprise a linear or branched alkyl ($C_nH_{2n+1}$, where 1≤n≤20), nitrogen, cyanogen, fluorine (F), chlorine (Cl), bromine (Br), iodine (I), and astatine (At).

* * * * *